United States Patent [19]
Larsson et al.

[11] Patent Number: 6,029,958
[45] Date of Patent: Feb. 29, 2000

[54] SHOCK ABSORBER

[75] Inventors: Lennart Larsson, Upplands Vasby, Sweden; Joseph E. Pitt, Cleveland, United Kingdom

[73] Assignee: Ohlins Racing AB, Upplands Vasby, Sweden

[21] Appl. No.: 08/874,034

[22] Filed: Jun. 12, 1997

[30] Foreign Application Priority Data

Jun. 25, 1996 [SE] Sweden .................................. 9602507

[51] Int. Cl.[7] .................................................. A47C 27/08
[52] U.S. Cl. ........................ 267/113; 188/282.5; 188/318
[58] Field of Search ................. 267/113, 64.16, 267/64.17, 64.18, 64.22, 64.15; 188/299.1, 318, 315, 281, 282.5, 316, 322.22, 322.15

[56] References Cited

U.S. PATENT DOCUMENTS

| | | |
|---|---|---|
| 3,990,687 | 11/1976 | Curnutt . |
| 4,054,277 | 10/1977 | Sirven ................................. 188/318 X |
| 4,624,346 | 11/1986 | Katz . |
| 4,732,244 | 3/1988 | Verkuylen .............................. 188/318 |
| 4,749,068 | 6/1988 | Sirven ........................... 188/322.15 X |
| 4,813,519 | 3/1989 | Matsubara et al. .................. 188/299.1 |
| 4,883,150 | 11/1989 | Arai ....................................... 188/289 |
| 4,890,822 | 1/1990 | Ezure et al. ..................... 267/64.28 X |
| 4,921,224 | 5/1990 | Fukumura et al. ................. 188/318 X |
| 4,936,424 | 6/1990 | Costa ................................... 188/299.1 |
| 5,201,389 | 4/1993 | Miller et al. ............................ 188/299 |
| 5,248,014 | 9/1993 | Ashiba .................................... 188/282 |
| 5,293,971 | 3/1994 | Kanari et al. . |
| 5,351,790 | 10/1994 | Machida ............................ 188/299.1 X |
| 5,480,011 | 1/1996 | Nagai et al. ......................... 188/299.1 |
| 5,597,054 | 1/1997 | Nagai et al. ........................ 188/318 X |
| 5,810,128 | 9/1998 | Eriksson et al. ............... 188/322.15 X |

FOREIGN PATENT DOCUMENTS

| | | |
|---|---|---|
| 0668175 | 8/1995 | European Pat. Off. . |
| 0748950 | 12/1996 | European Pat. Off. . |
| 4237156 | 3/1994 | Germany . |
| 59-6448 | of 1984 | Japan . |
| 2-168038 | of 1990 | Japan . |
| 02168038 | 6/1990 | Japan . |
| 2 202 921 | of 1988 | United Kingdom . |

*Primary Examiner*—Mark T. Le
*Assistant Examiner*—Pamela J. Lipka
*Attorney, Agent, or Firm*—Pollock, Vande Sande & Amernick

[57] ABSTRACT

A shock absorber has a cylinder with a piston and piston rod arrangement in the cylinder. Working medium can be guided in different flow paths via shim stacks for the purpose of obtaining different dampings based on the position of the piston. The piston arrangement can have a piston supporting shim stacks. One or more further shim stacks are arranged in a unit which is separate from the cylinder. In at least one of the shock absorber strokes, the working medium can be conveyed via the shim stack(s) in the unit separate from the cylinder.

2 Claims, 30 Drawing Sheets

SHOCK ABSORBER

TECHNICAL FIELD

The present invention relates to a shock absorber for vehicles, for example cars, motor cycles, etc. The shock absorber comprises a cylinder with piston and piston rod arrangement in the cylinder. A working medium can be guided inside the cylinder in different flow paths via shim stacks for the purpose of obtaining different dampings.

BACKGROUND OF THE INVENTION

The use of a plurality of shim stacks in double-piston arrangements is already known through British Patent Specification 2 202 921. The pistons or the piston arrangements can cooperate, in the inner positions of the pistons, with a constriction element (guide pin) which is arranged in the cylinder and with which the piston or the piston arrangement comes into cooperation so that the working medium is guided via a further shim stack, compared to the case where the pistons assume more outward positions relative to the shock absorber cylinder. By means of guiding the working medium between different numbers of shim stacks, the shock absorber has an automatically adjustable, position-dependent damping function which provides maximum damping in the innermost position of the pistons. When the pistons are not cooperating with the constriction element, the working medium is guided via a central recess in the piston arrangement. When the constriction element and the piston arrangement come into cooperation, the flow of the working medium is constricted in the central recess and the working medium is instead conveyed through the further shim stack. The constricting increases and is at its greatest, for example, in the absolute inner position of the pistons. The function described thus means that the rise in damping force increases the nearer the pistons are to the end position in relation to the constriction element, and vice versa.

To facilitate the description of the novel shock absorber hereinbelow, use is made of the expressions inner and outer positions of the piston arrangement. Inner positions are understood as meaning the piston positions where the piston arrangement has come into cooperation with the constriction element, and outer positions are to mean piston positions where the piston arrangement does not cooperate with the the constriction element.

In some cases it is necessary to be able to avoid using double-piston arrangements which make the shock absorber more complicated, with more parts and packings which are exposed to wear. Thus, making intervals between services and shock absorber replacements become relatively short compared to the case of a single-piston arrangement. The invention aims to solve these problems, among others.

There is also a requirement to provide different constructional possibilities with regard to the structure of the shock absorber and the manufacture of the shock absorber. The shock absorber manufacturer often desires different construction possibilities without running the risk of deviating from the fundamental principle, i.e. the use of shim stacks or the equivalent which are engaged and disengaged in different mutual positions between the piston and the cylinder. There is therefore a need for a modular concept in association with this type of shock absorber in which it is possible to incorporate the specific client requirements into a current shock absorber which can be characterized by small production series. The invention aims to solve this problem too.

It is also important, in this type of shock absorber, to be able to incorporate other types of devices acting on the working medium, for example devices acting on bleeding and damping force, which can be manual and/or sensor-controlled. It must be possible for this incorporation to be carried out with good accessibility and without affecting the control of the shim stacks or the equivalent. The invention also solves this problem.

In a double-piston arrangement, for example, there may be a requirement to effect two or more damping force adjustments, and this must be done in a manner which is not position-dependent. The invention solves this problem.

SUMMARY OF THE INVENTION

That which can principally be regarded as characterizing a shock absorber according to an embodiment of the invention is, among other things, that the piston arrangement has a single piston supporting shim stacks. One or more further shim stacks are also arranged in a unit which is separate from the cylinder or in a unit which is mounted integrally in the cylinder. Upon the expansion and compression strokes of the shock absorber, the working medium can be conveyed via a first shim stack in outer positions of the piston relative to the cylinder and via further shim stacks in inner positions of the piston relative to the cylinder, in order to achieve, in the inner positions, an increased damping compared to the case with the outer positions. In at least one of the shock absorber strokes, the working medium can be conveyed via the shim stack or the shim stacks in the unit separate from the cylinder and/or the integrally mounted unit.

In one embodiment of the characteristic embodiment, the shock absorber comprises a single piston with three shim stacks and in the unit separate from the cylinder there is in this case an arrangement with one or two shim stacks. The center-most shim stack of the piston can be arranged inside the piston and the other two shim stacks are arranged at the upper and lower sides of the piston. During each expansion stroke, at the inner position of the piston, the center-most shim stack and the inner shim stack are engaged, i.e. operative. During expansion strokes, at the outer positions of the piston, only the center shim stack is engaged because medium is allowed to pass through the inside of the piston from an outer space inside the piston in front of the center-most shim stack, via through-orifices, to a central, axially extending passage in the piston/piston rod. During compression strokes, at the outer position of the piston, the outer shim stack of the piston is engaged, and, during compression strokes, at the inner position of the piston, a shim stack in the unit connected to the cylinder is additionally engaged (operative). The working medium can be conveyed via a central, axially extending recess in a constriction element, which can cooperate with the piston, via through-orifices to the said space.

In a further embodiment of the inventive concept, the piston has an inner shim stack and an outer shim stack. Upon expansion strokes, the inner shim stack on the piston and a first shim stack in the unit are operative in the inner position of the piston for the purpose of obtaining an increased damping compared to the case at the outer positions of the piston. In the inner position, working medium can be conveyed via an outer space in the inside of the piston, via through-orifices and an axially extending inner connection in a constriction element which can cooperate with the piston, to the first shim stack in the unit. Upon compression strokes, the outer shim stack on the piston and the second shim stack in the unit are operative in the inner positions of the piston, and only one shim stack of the last-mentioned two shim stacks in the outer positions of the piston.

In a further embodiment, the unit mounted integrally in the cylinder is situated at the inner end of the cylinder and supports two shim stacks which are each activatable in the expansion and compression positions, respectively, when the piston assumes its inner positions, together with the respective shim stack on the piston. Control and/or guide members can further be arranged in the flow paths in the area of the transition between the cylinder and the unit. The bleeding and/or damping constant functions can be applied here and can be readily activated, even in shock absorbers of this type.

The shock absorber can also comprise a single piston provided with two shim stacks and a constriction passage, via which working medium can be conveyed during expansion and compression strokes when the piston is situated in its outer positions, and in which constriction the working medium is constricted completely or partially when the piston is situated in its other positions. The shim stacks here work parallel to the constriction passage function and are activated or operative one at a time during the expansion and compression strokes, respectively. In one embodiment in this connection, the constriction passage is arranged such that it can be regulated by means of a needle nozzle which can be activated for complete or partial constriction of the passage when the piston assumes its inner positions.

The shock absorber can also comprise a single piston designed with four shim stacks, of which the two inner shim stacks are activated or operative during expansion strokes when the piston assumes its inner positions, and of which only one of the two inner shim stacks is activated during expansion strokes when the piston assumes its outer positions. Of the four shim stacks, the two outer shim stacks are activated during the compression stroke, when the piston assumes its inner positions, and one of the two outer shim stacks is activated during compression strokes, when the piston assumes its outer positions. One embodiment in this connection can be that the single piston is mounted in the cylinder via its central parts, and that the piston is provided on both sides with hood-shaped or cap-shaped parts, outside which working medium can be conveyed during the expansion and compression strokes.

The shock absorber can also comprise a single piston arranged with two or three shim stacks, where one or two first shim stacks are assigned the first stroke of the expansion and compression strokes and the third shim stack is assigned the second stroke of the expansion and compression strokes. In the case of two first shim stacks, one is activated or operative when the piston assumes its outer positions and both are activated when the piston assumes its inner positions. The third shim stack is arranged to be acted upon by members which, as a function of the action exerted, change the spring constant in the third shim stack. The third shim stack, as a function of this action, acquires a higher spring constant when the piston assumes its inner positions than when the piston assumes its outer positions. In one embodiment in this connection, a displaceable slide can be arranged to act, via a spring, on the shim stack when a constriction element in the cylinder comes into cooperation with the piston and closes in an oil volume which generates the action of the slide and thereby on the third shim stack so as to increase its spring constant.

The shock absorber can also comprise to pistons, each with its pair of shim stacks which serve each stroke of the expansion and compression strokes. In each stroke the selection of coupled or activated shim stack can be made by means of an activation member. The two shim stacks in each pair have different spring constants, and each stroke can be provided with a selectable spring constant as a function of the activation by the activation member. One embodiment in this connection is that a slide is arranged in the center of the piston rod. As a function of the position of the slide, the working medium can be conveyed via one or other shim stack in each respective pair of shim stacks.

In one embodiment of the inventive concept, the damping is arranged such that when the piston enters and is placed in the inner positions, the damping is greater than in the outer positions. The damping increases the further the piston moves into or is situated in the cylinder. That is to say, the end-position damping is great compared to the other positions of the piston.

ADVANTAGES

By means of what has been proposed above, cost-effective shock-absorber constructions can be produced, at the same time meeting the stringent demands on end-position damping and possible control and regulation of the bleeding and damping constants. There is great adaptability to client requirements and to production of small shock absorber series. The use of a single-piston arrangement is advantageous from the economic and technical point of view. A position-dependent damping function is effected, as well as controllable variable damping functions, for example the choice of two different damping constants can be easily made. The damping force can be acted upon both in the compression and expansion directions, as well as in only one shock absorber direction. Possibilities of further adjustments to the bleeding and damping constants can easily be afforded, if such are desired.

BRIEF DESCRIPTION OF THE FIGURES

A presently proposed embodiment of a device which has the characteristics of the invention will be described hereinbelow with the aid of the attached drawings, in which.

DETAILED DESCRIPTION OF THE INVENTION

Figure 1:
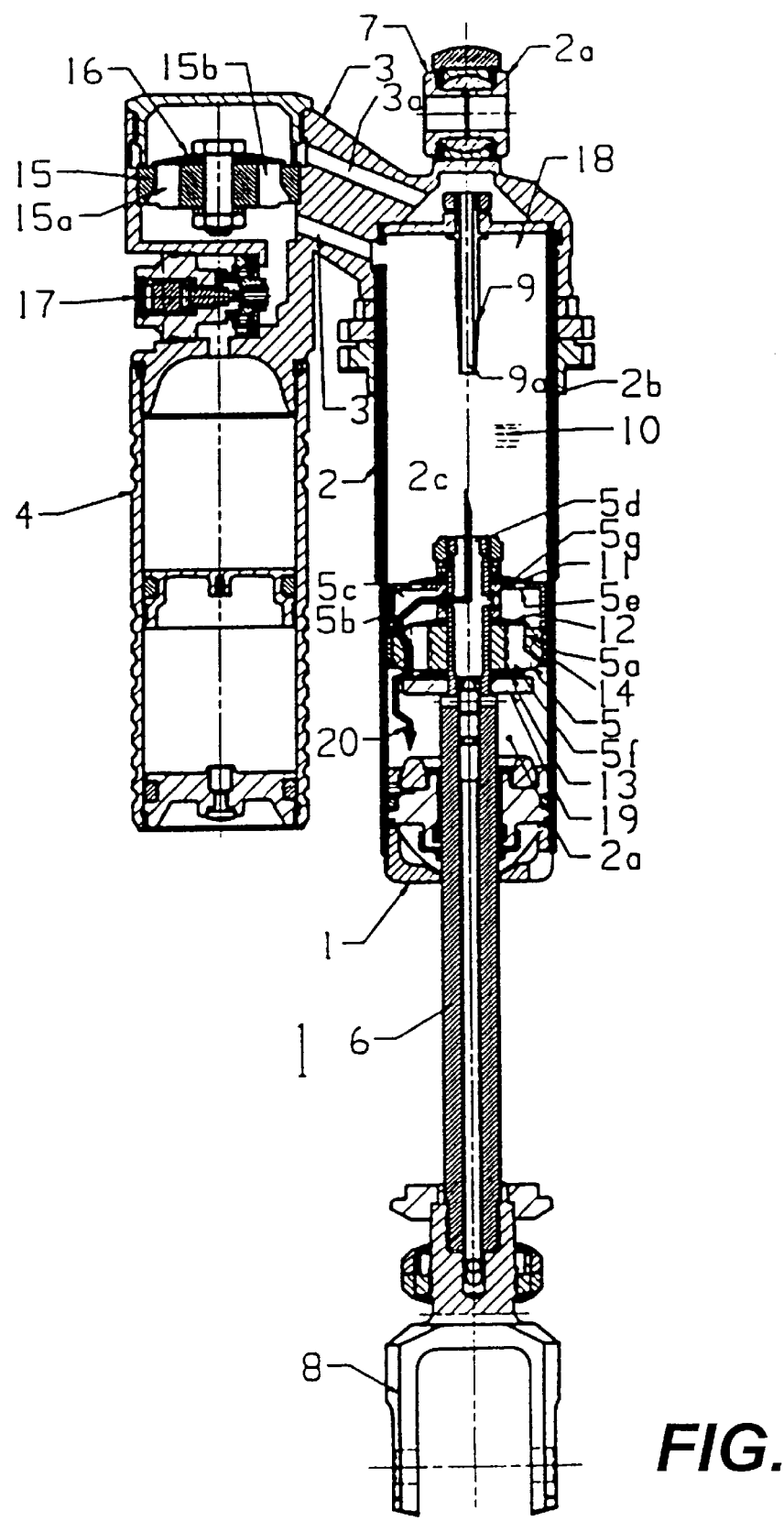
FIGS. 1–34 show, in vertical sections, different embodiments of shock absorbers, and their functions in the different embodiments.

FIG. 1 shows a shock absorber 1 with a cylinder 2 and a unit 4 connected to the latter via connection unit 3. Arranged in the cylinder there is a piston arrangement 5 which is connected to a piston rod 6. The cylinder and the piston rod can be secured on the vehicle in question, for example motor cycle (at its rear wheel), via attachments 7 and 8, respectively. At its upper end 2a, the cylinder is provided with a constriction element 9 and the piston works in a working medium 10 (hydraulic oil with additives). These parts indicated are known per in terms of their structure and function and they will therefore not be described in detail here.

Specific to this embodiment of the invention is, among other things, a piston arrangement comprising a single piston 5 arranged with three shim stacks 11, 12 and 13 and through-flow channels and orifices for the working medium in accordance with what is stated hereinbelow. The piston 5 has a piston part 5a which can cooperate with the inner wall 2b of the cylinder and which is provided with a packing 14 located between the piston part and the cylinder wall. In addition, there is a hood-shaped part 5b which encloses a piston outer space 5c. The piston, and possibly a part of the piston rod, has an axially extending recess 5d. There are in addition, in a known manner, through-orifices 5e and channels between the upper and lower sides 5f of the piston (some inclined in a known manner) and transverse orifices 5g in the piston.

The constriction element 9 has an axially extending inner channel 9a and the connection 3 has two connection channels 3a, 3b. In the unit 4 there is a unit 15 which is mounted integrally in the unit 4. The unit 15 supports a shim stack 16 on its upper side and is provided with through-channels 15b between its top and bottom sides. Activation members 17 are arranged in a known manner for controlling the working medium. These activation members do not in themselves concern the invention and therefore will not be described here. The shim stacks are constructed and function in a manner known to one skilled in the art and they too will not be described in detail here.

In FIG. 1 the shock absorber has begun to effect a compression stroke and the piston moves inside the cylinder (relative to the cylinder) in the direction towards an inner end position, symbolized by 18. The piston is situated in one of its outer positions, i.e. the positions in which there is no cooperation with the constriction element 9. The medium flows from the upper side 2c of the cylinder to the underside 2a of the piston via the axial recess 5d, transverse orifices 5g, the outer space 5c, through-channel(s) 5f and the shim stack 13, which is directed so that it engages with the medium (i.e. in its operative function) and provides resistance to the through-flow of medium in a known manner. The deflection of the shim stack is limited by stop members 19. The other two shim stacks are directed so that they prevent flow through orifices 5e and some of orifices 5f. These positions are referred to here as non-engaging positions, since the shim stacks in these positions only have the task of preventing medium from flowing through. The shock absorber thus works with the spring constant effected by the shim stack. The flow of medium is shown by 20.

Figure 2:
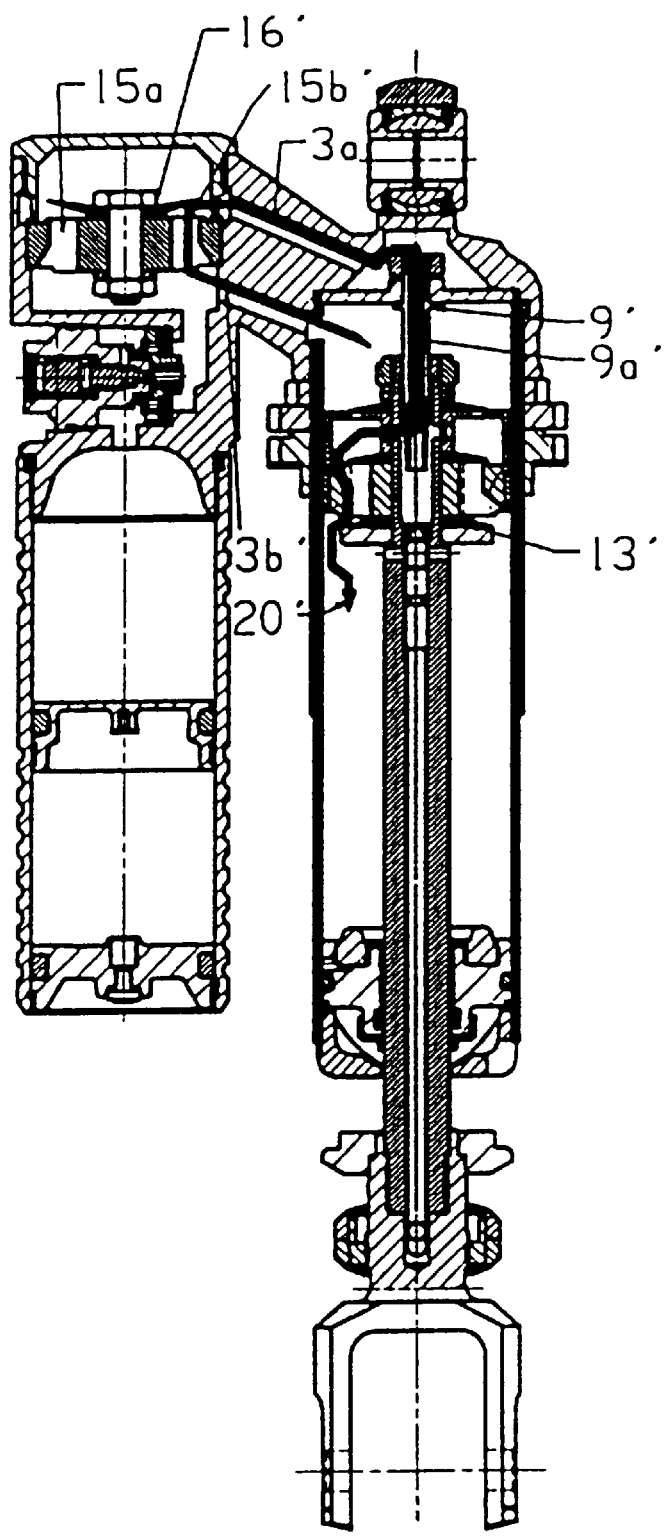

FIG. 2 shows the path of the flow of medium 20' upon compression strokes when the piston is situated in an inner position, i.e. a position where cooperation has been established with the constriction element 9'. The cooperation with the constriction element has the effect that the medium is conveyed via the channel 3b', channels 15a', 15b', and engages the shim stack 16', which thus acts on the working medium in series with the shim stack 13' already coupled-in during the compression stroke. Thus, overall, the damping constant will be increased by the fact that the spring constant in the shim stack 16' is added to the spring constant in the shim stack 13'. The medium is conveyed further via the channel 3a', the axial channel 9a' in the constriction element, the transverse orifice (see 5g in FIG. 1) in the piston, the outer space of the piston, and in channel(s) 5f and via the shim stack 13' to the underside of the piston.

Figure 3:
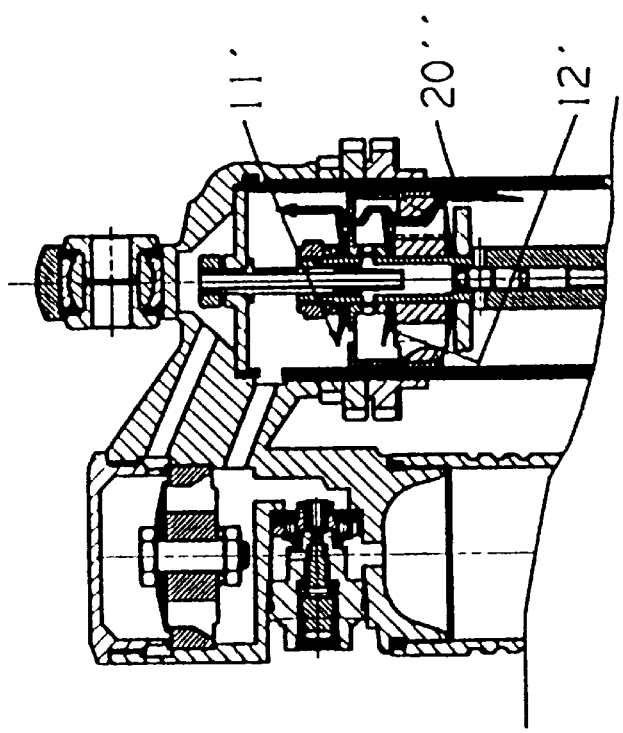

FIG. 3 shows expansion stroke starting from an inner position of the piston in the cylinder, in which inner position the damping is high and therefore two shim stacks 11' and 12' in the piston are coupled in series. The medium is in this case conveyed from the underside of the piston, through-channel(s) (see 5f in FIG. 1), via the center-most shim stack 12', the outer space (see 5c in FIG. 1), and via the second shim stack 11' on the piston.

Figure 4:
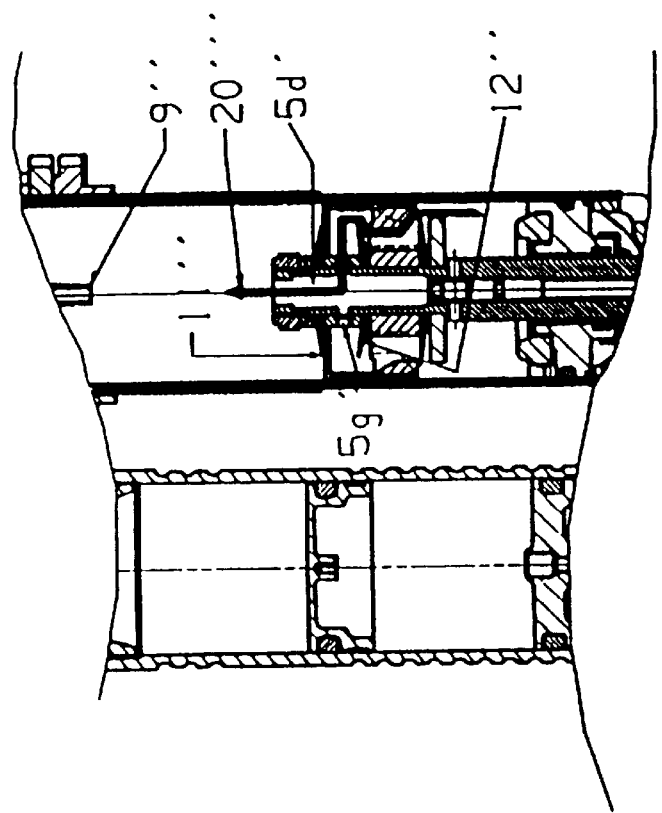

FIG. 4 shows the expansion stroke of the shock absorber when the piston assumes a position of noncooperation with the constriction element 9'', which means that the flow of medium takes an alternative flow path via the outer space of the piston, transverse orifices 5g' and the axial recess 5d' of the piston. The shim stack 11'' has in this way been uncoupled and only the shim stack 12'' is engaged, with the result that the total spring constant has been reduced by the spring constant of the shim stack 11''.

Figure 5:
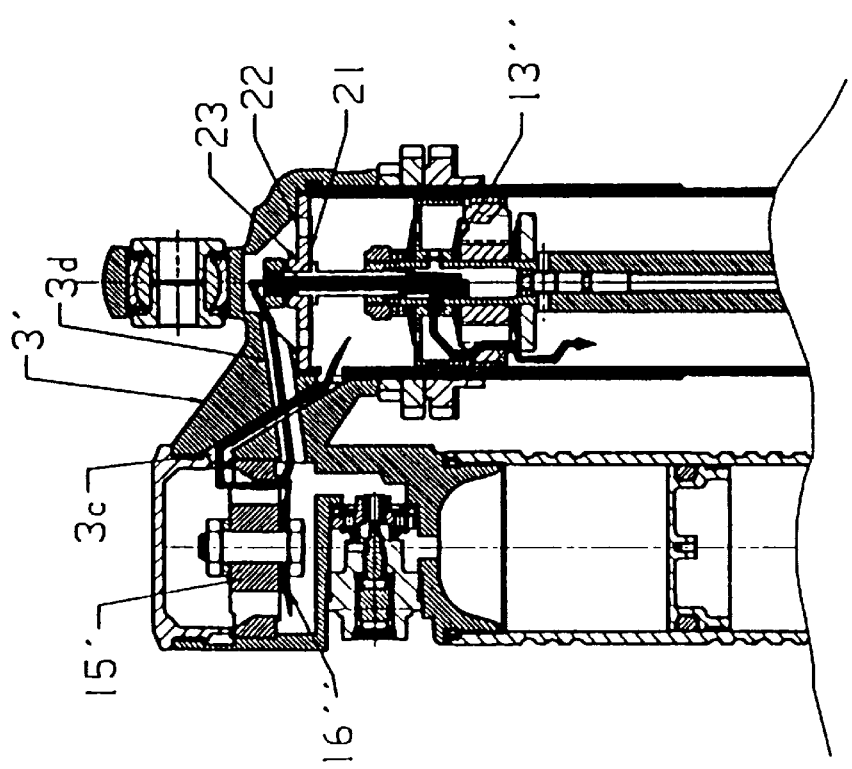

FIG. 5 shows the application of the shim stack 16'' of the unit 15' arranged on the underside of the unit instead of on the top side of the unit. FIG. 5 also shows a compression position where the piston assumes an inner position or position of cooperation with the constriction element (see 9' in FIG. 2). The channels 3c and 3d of the central part 3' are in this case arranged in such a way that the medium at the top side of the piston is conveyed via the channel 3, to the top side of the unit 15' and down via its orifices (see 15a', 15b' in FIG. 2) to engage with the shim stack 16'', which is thus coupled in series with 13'' in accordance with the above. In this case use is also made of a closure member (spring) 21 which prevents the medium from passing out via orifice 22 in an inner gable wall 23 in the cylinder to the connection 3d.

Figure 6:
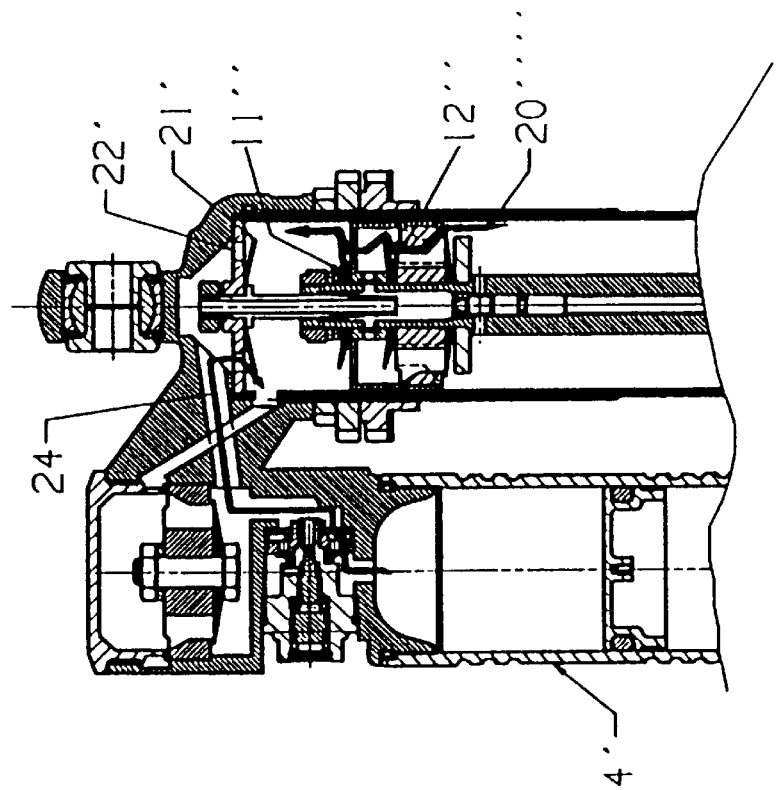

FIG. 6 shows the case with expansion stroke when the piston assumes an inner position or position of cooperation with the constriction element (see 9 in FIG. 1). The medium 20''' can be displaced from the underside of the piston to its top side. The overpressure in the unit 4' causes a flow of medium 24 from the unit 4' to the top side of the piston via the spring 21', opened by the flow of medium 24, and the orifices 22'. Medium which is thus accumulated in the unit 4' during compression can be returned to the cylinder in accordance with the basic principle applied. In this case, the shim stacks 11'' and 12'' of the piston are engaged or operative and thus give rise to the trended spring constant in the shock absorber function.

Figure 7:
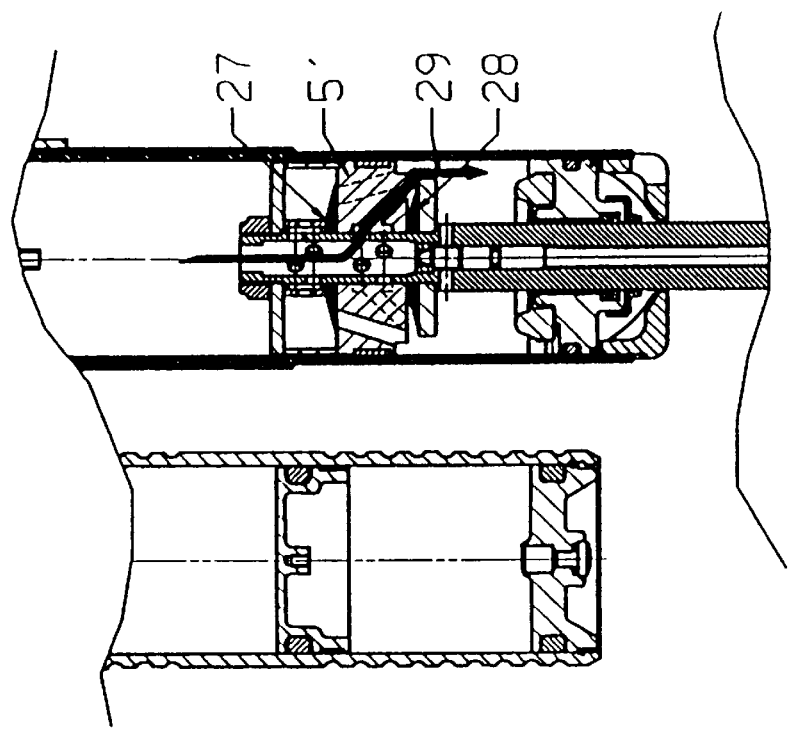
Figure 8:
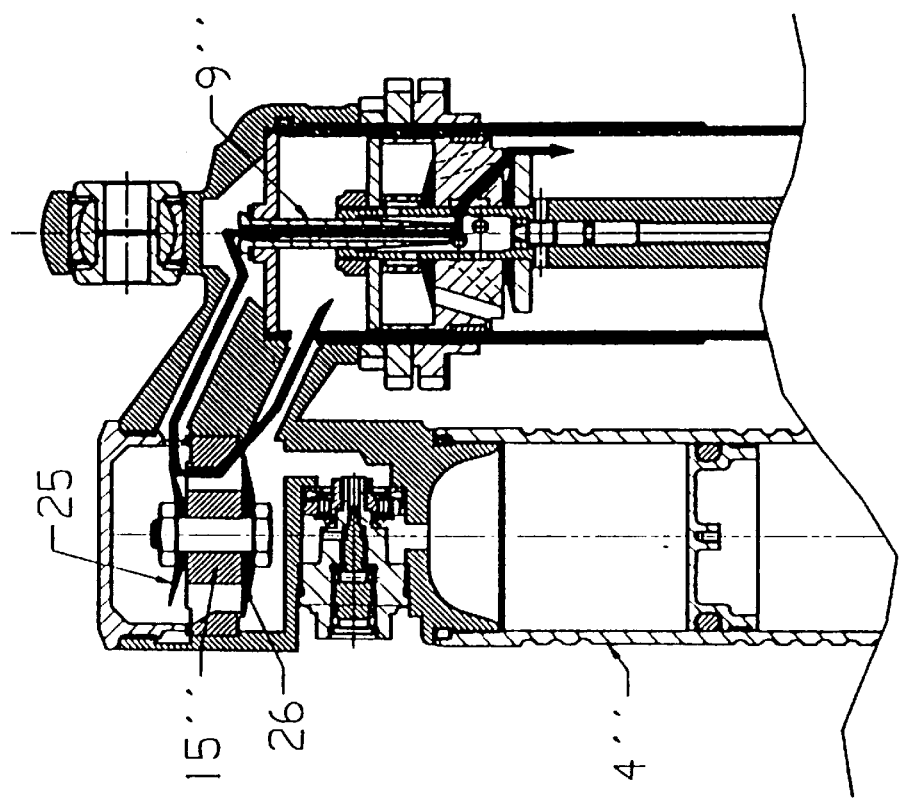
Figure 10:
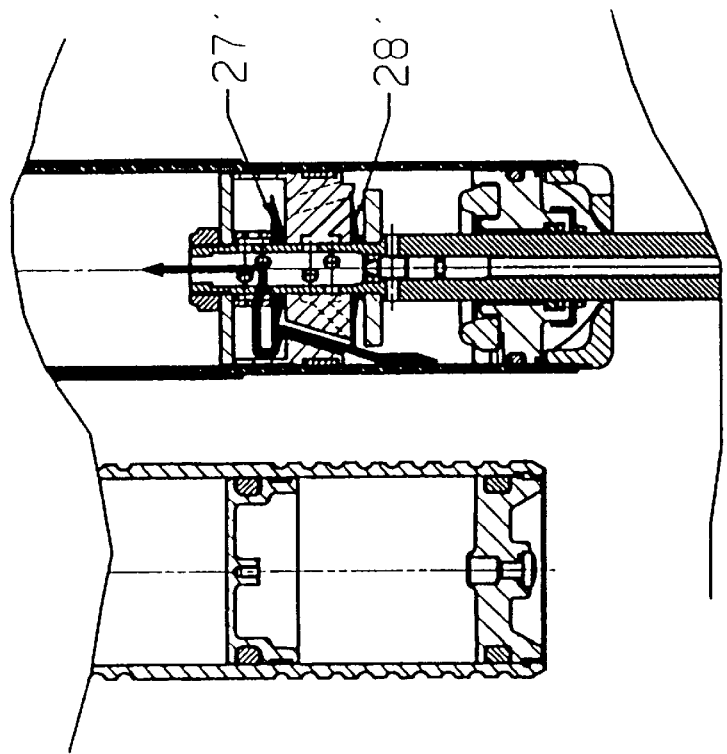
Figure 9:
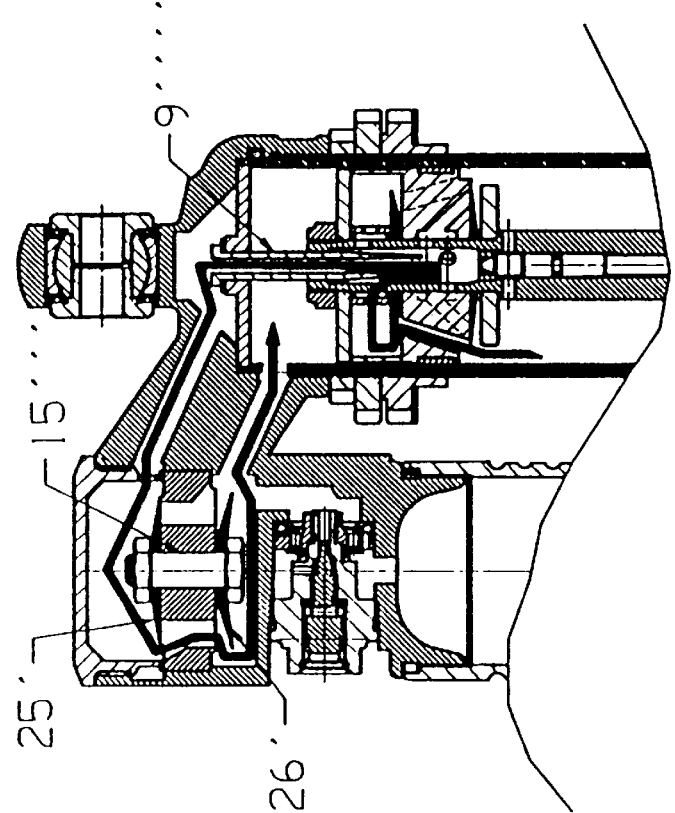

FIGS. 7–10 show an embodiment in which the fixed unit 15'', 15''' supports shim stacks 25, 26 on its top and bottom sides. FIGS. 7 and 8 show the compression stroke, and FIGS. 9 and 10 the expansion stroke. FIGS. 7 and 10 show when the piston assumes outer positions or positions of non-cooperation with the constriction element 9''' and 9'''', i.e. outer positions. FIGS. 8 and 9 show inner positions capable of cooperation with the constriction element. In this case, the piston supports only two shim stacks 27, 27' and 28, 28', respectively, here referred to as upper and lower shim stacks.

Upon compression in the outer position according to FIG. 7, only the lower shim stack 28 is activated and acts on the flow of medium 29 (see 20 in FIG. 1). The flow of medium passes through a central recess in the piston and transverse orifices which convey the flow towards the shim stack 28. Upon compression in the inner position according to FIG. 8, the upper shim stack 25 on the unit 15'' is additionally engaged. The medium is conveyed via channels in the central part between the unit 4'' and the cylinder (see FIG. 1) via shim stack 25, a second channel in the central part, the central recess in the constriction element and out via transverse orifices to the lower shim stack on the piston. According to FIG. 9, the medium is in principle conveyed in the opposite direction via the upper shim stack on the piston and the lower shim stack on the unit. In FIG. 10, only the upper shim stack 27' on the piston is activated (and no shim stack on the unit, for which reason this is not shown).

The embodiments according to FIGS. 1–10 provide damping which involves a gradually increasing damping force towards the end of the stroke length, both on the compression stroke and the return stroke.

Figure 11:
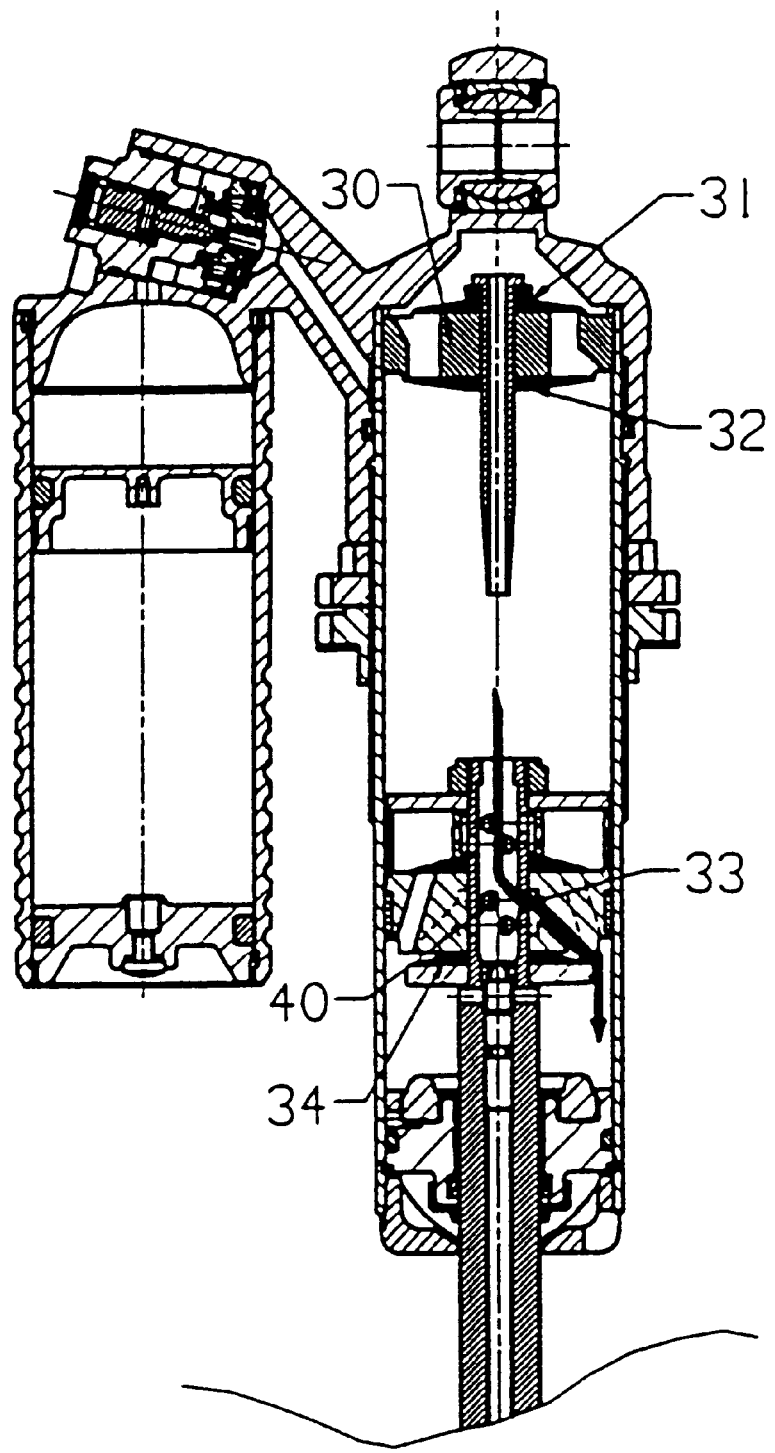
Figure 12:
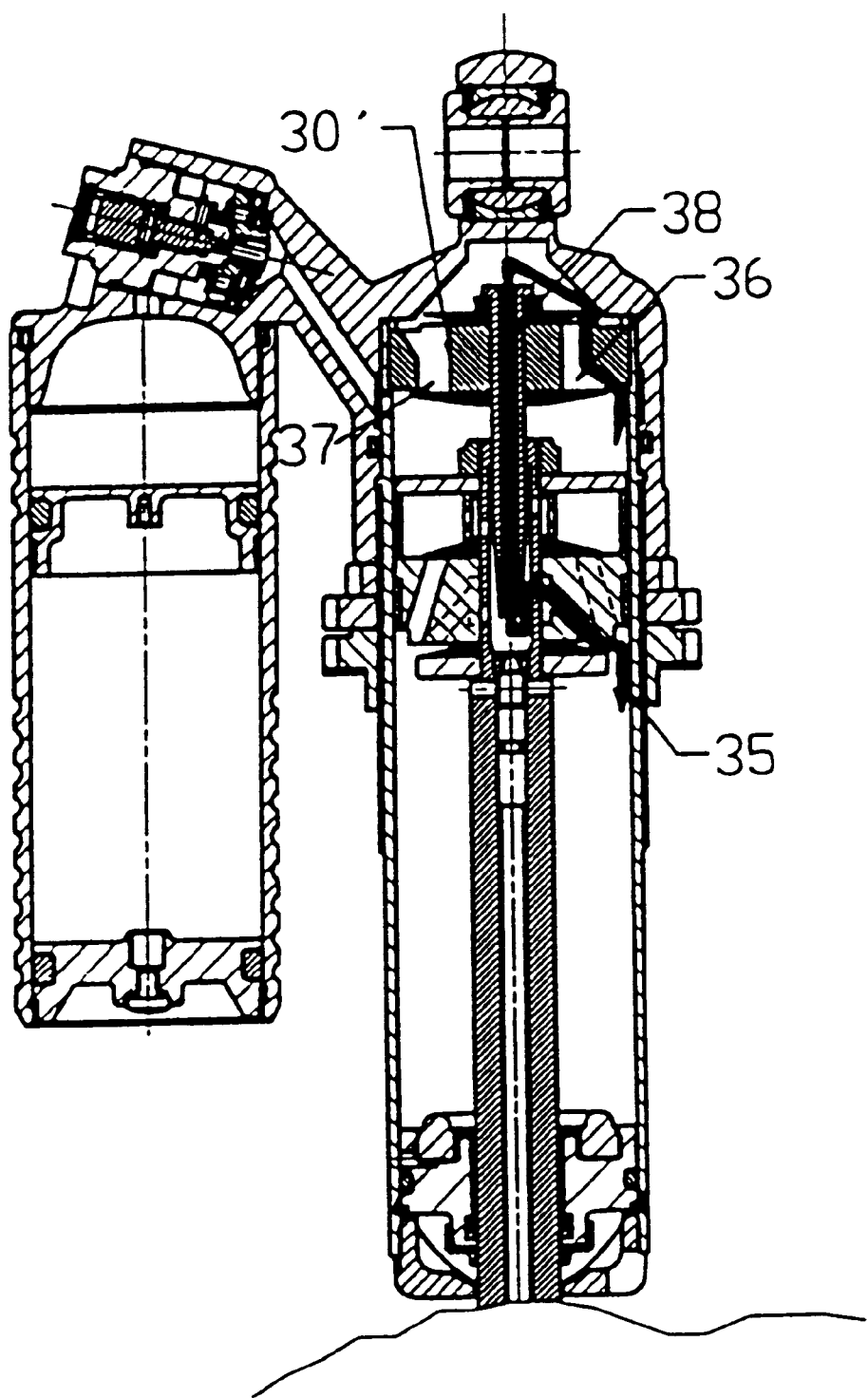

In the embodiment according to FIGS. 11–14, the movable piston supports two shim stacks, the upper and the lower shim stack 33, 34. Also included is a piston 30, 30' which is mounted in a fixed manner right inside the cylinder tube 2'. The fixed piston 30, 30' supports upper and lower shim stacks 31, 32. FIG. 11 shows a compression stroke with the piston in the outer position. Only the lower shim stack 34 on the movable piston is activated, i.e. no shim stack on the fixed piston is activated. When the movable piston according to FIG. 12 comes into cooperation with the constriction element (see 9 in FIG. 1) during compression strokes, the upper shim stack 31 on the fixed piston is also activated. The flow 35 of medium is conveyed from the top side of the movable piston, via orifices 36, 37 in the fixed piston, to engage with the shim stack 31. From the top side of the fixed piston, the flow is conveyed through a central recess 38 in the fixed piston or the constriction element (see 9 in FIG. 9) which is mounted in the fixed piston, and transverse orifices 40, to engage with the lower shim stack 34 on the movable piston.

Figure 13:
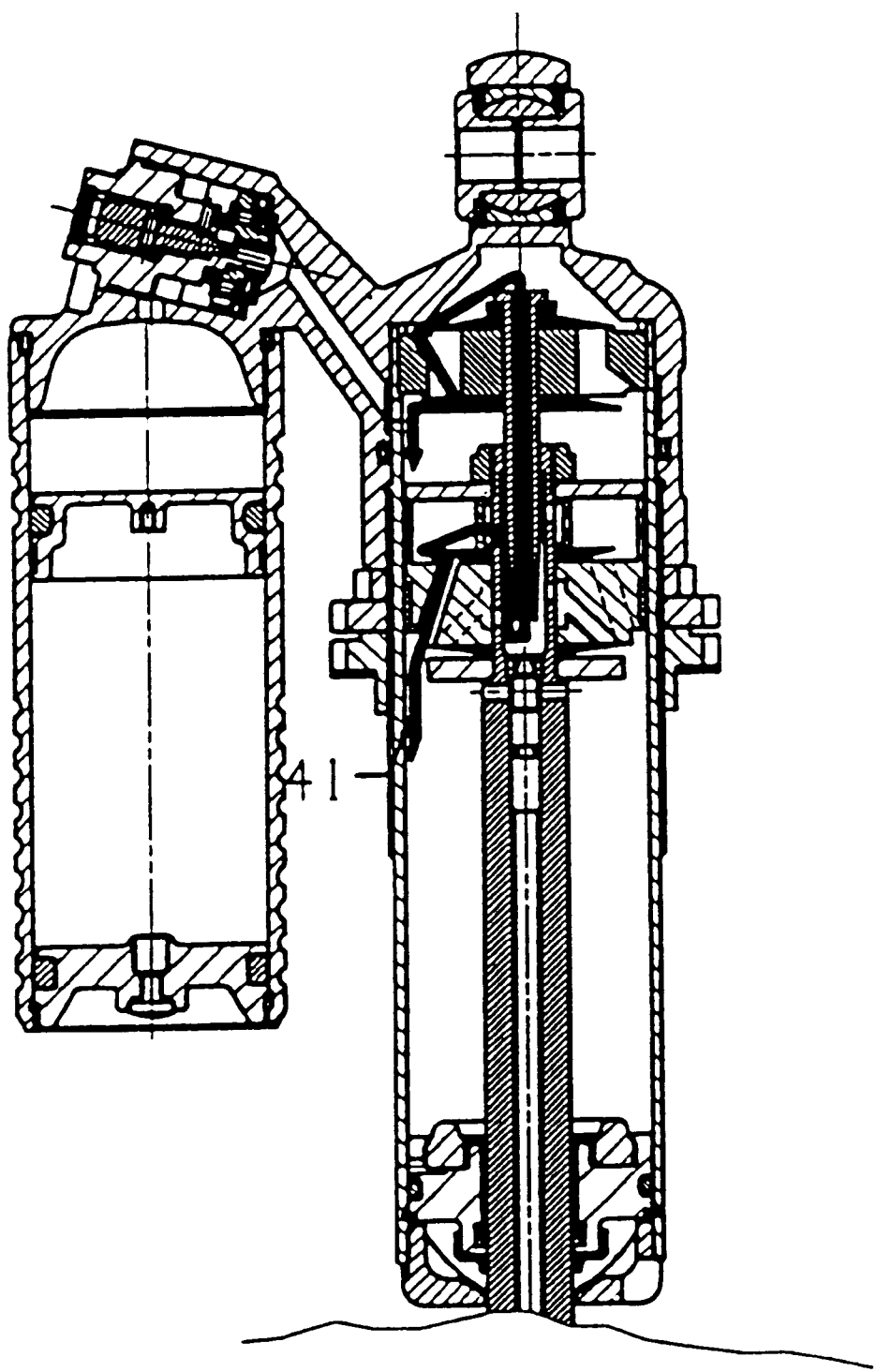
Figure 14:
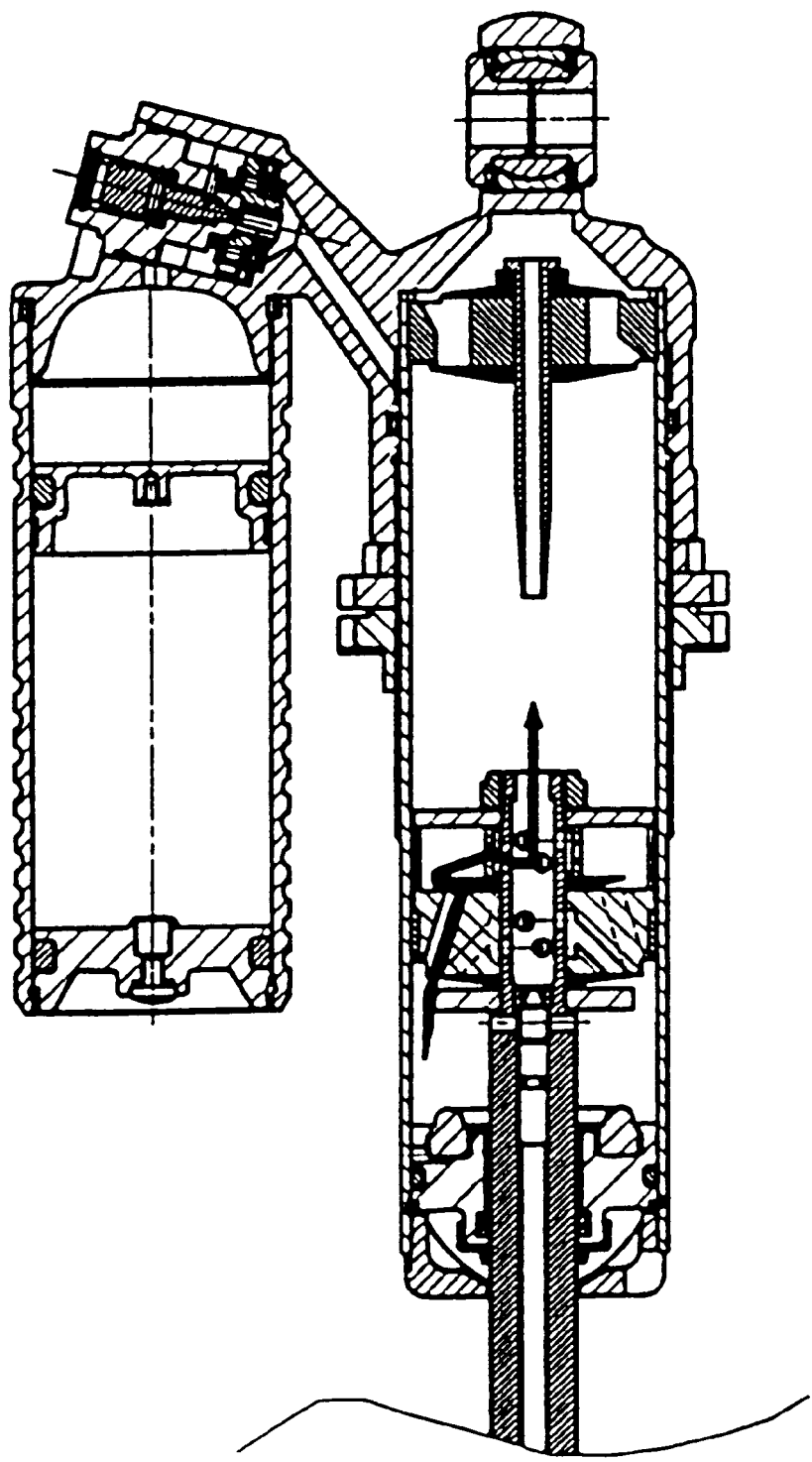

Upon expansion strokes from an inner piston position according to FIG. 13, the flow of medium is conveyed in essentially the opposite direction compared to the case according to FIG. 11, and the lower shim stack on the fixed piston and the upper shim stack on the movable piston are activated for acting on the medium. Upon expansion strokes in the outer position according to FIG. 14, the flow of medium has essentially the reverse direction in relation to the case according to FIG. 11, with the result that only the lower shim stack is activated, i.e. no shim stack on the fixed piston is activated. Different damping constants are thus engaged and disengaged during both compression and return strokes, with a gradually rising damping constant in the inner end position.

Figure 15:
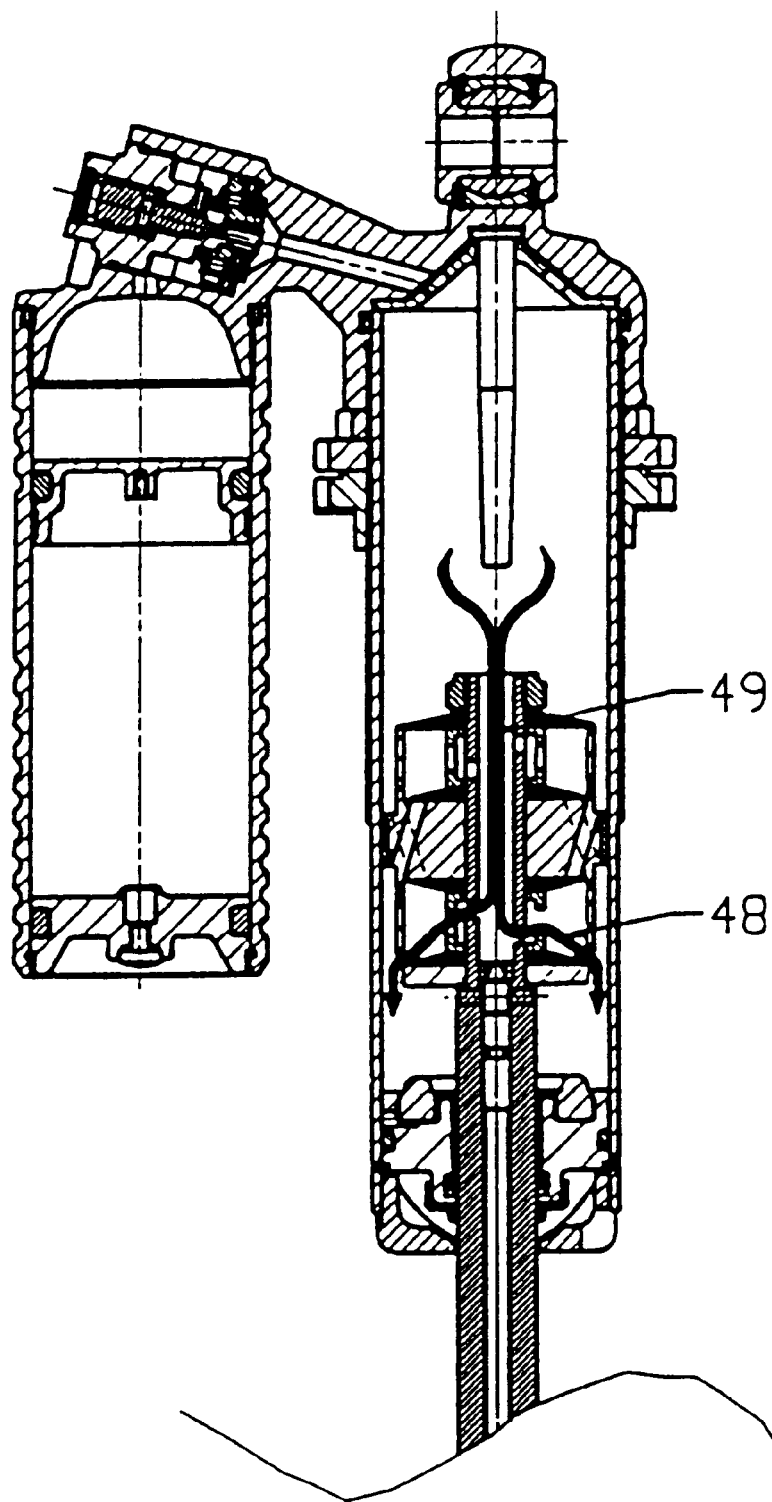
Figure 16:
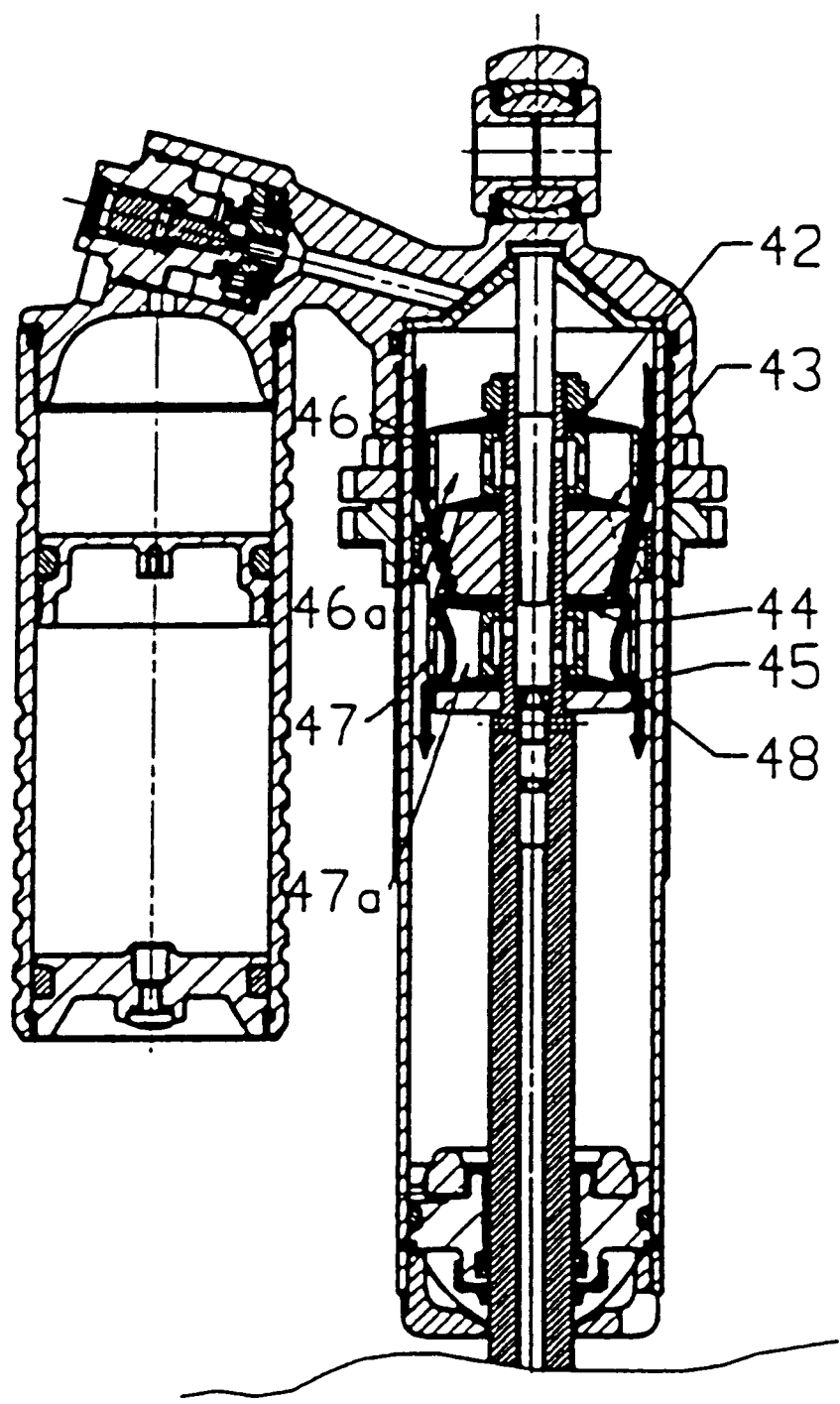
Figure 17:
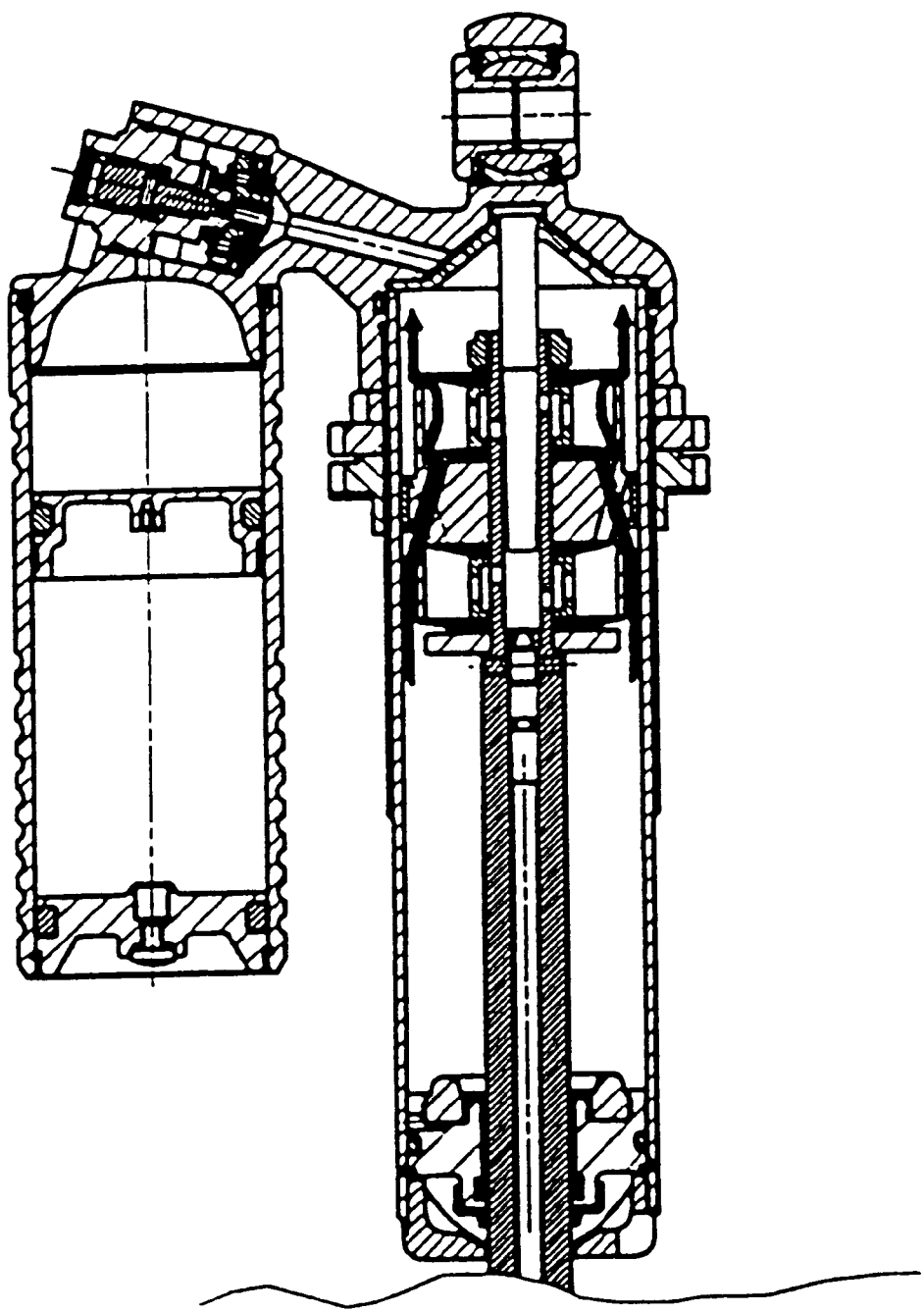
Figure 18:
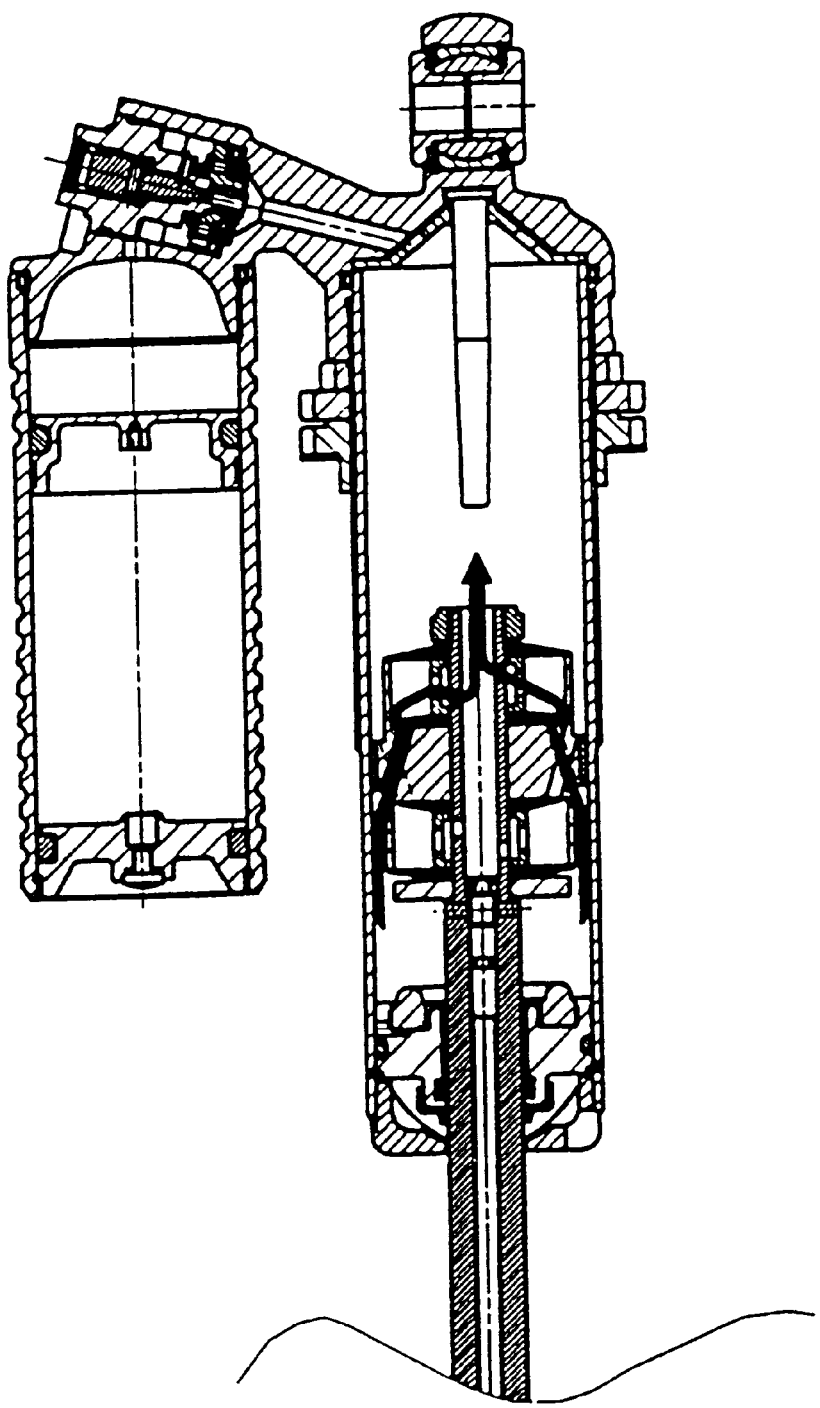

FIGS. 15–18 show a further illustrative embodiment which is based on one piston having two compression stacks and two return stacks. The function here is such that near the outer limit position, only one compression and return stack, respectively, functions, while near the inner limit position an additional shim stack gradually comes into engagement on both the compression and the return stroke. FIG. 15 shows the case with inner positions according to the above, and FIG. 16 shows the case where the piston is in cooperation with the constriction element. FIGS. 15 and 16 can be related to the compression stroke. FIGS. 17 and 18 can be related to the expansion stroke. FIG. 17 shows the case in the inner position, and FIG. 18 the case with in outer position. The shim stacks on the piston are indicated by 42, 43, 44 and 45. The piston has two hood-shaped attachment parts 46 and 47, the attachment part 46 extending from the upper side of the piston and the attachment part 47 extending from the lower side of the piston. The attachment parts have inner spaces 46a and 47a. In the case according to FIG. 15, only the shim stack 45 is engaged and the flow of medium 48 is conveyed from the top side of the piston through a central recess 49 in the piston out via transverse orifices from the central recess (see above) and out for engagement with the shim stack 45.

When the piston according to FIG. 16 has come into engagement with the constriction element, the shim stack 44 is also engaged or activated, i.e. the two lowermost shim stacks 44 and 45 are engaged in this case. The flows of medium from the top side to the bottom side of the piston are conveyed outside the first hood-shaped part 46, and in via the space 47a towards the lower shim stack 45.

Upon the expansion stroke according to FIG. 17, where the piston is in engagement with the constriction element, the medium is conveyed essentially in the opposite direction compared to the case according to FIG. 16. In this case, the two upper shim stacks 42 and 43 are used instead, and the medium is conveyed on the outside of the hood-shaped part 47 into the space 46a, whereupon, on entry into the space, the lower of the upper shim stacks 43 is engaged and, upon exit from the space 46a, the upper shim stack 42 of the upper shim stacks is engaged. When the piston during expansion strokes is not in cooperation with the constriction element, the medium is conveyed in a manner corresponding to the case according to FIG. 15. The medium is conveyed via the outside of the hood-shaped part 47, via the through-orifices of the piston (see above) and into the space 46a, in which the medium is conveyed via transverse orifices (cf. above) into the central recess in the piston to the top side. On entry into the space 46a, the lower shim stack 43 of the two upper shim stacks is engaged.

Figure 19:
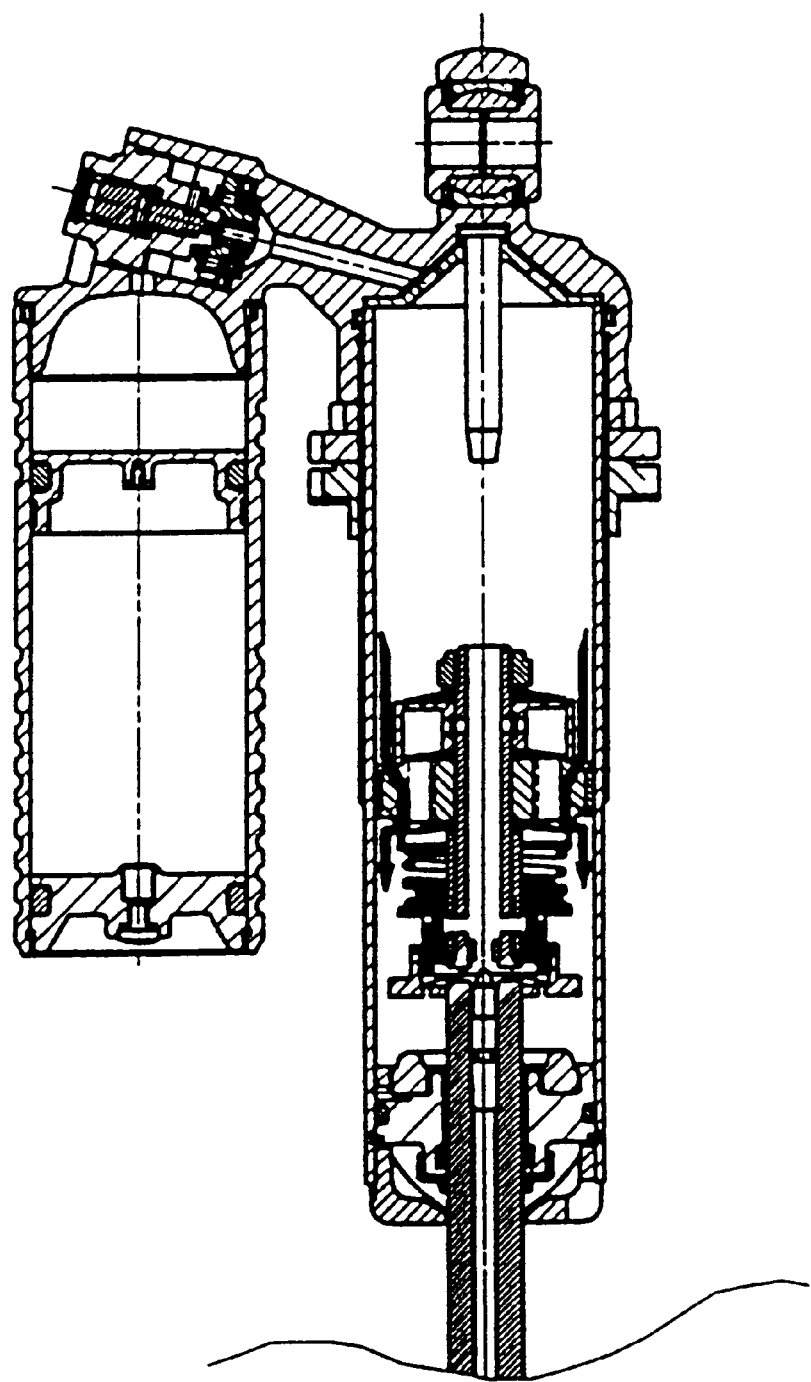
Figure 20:
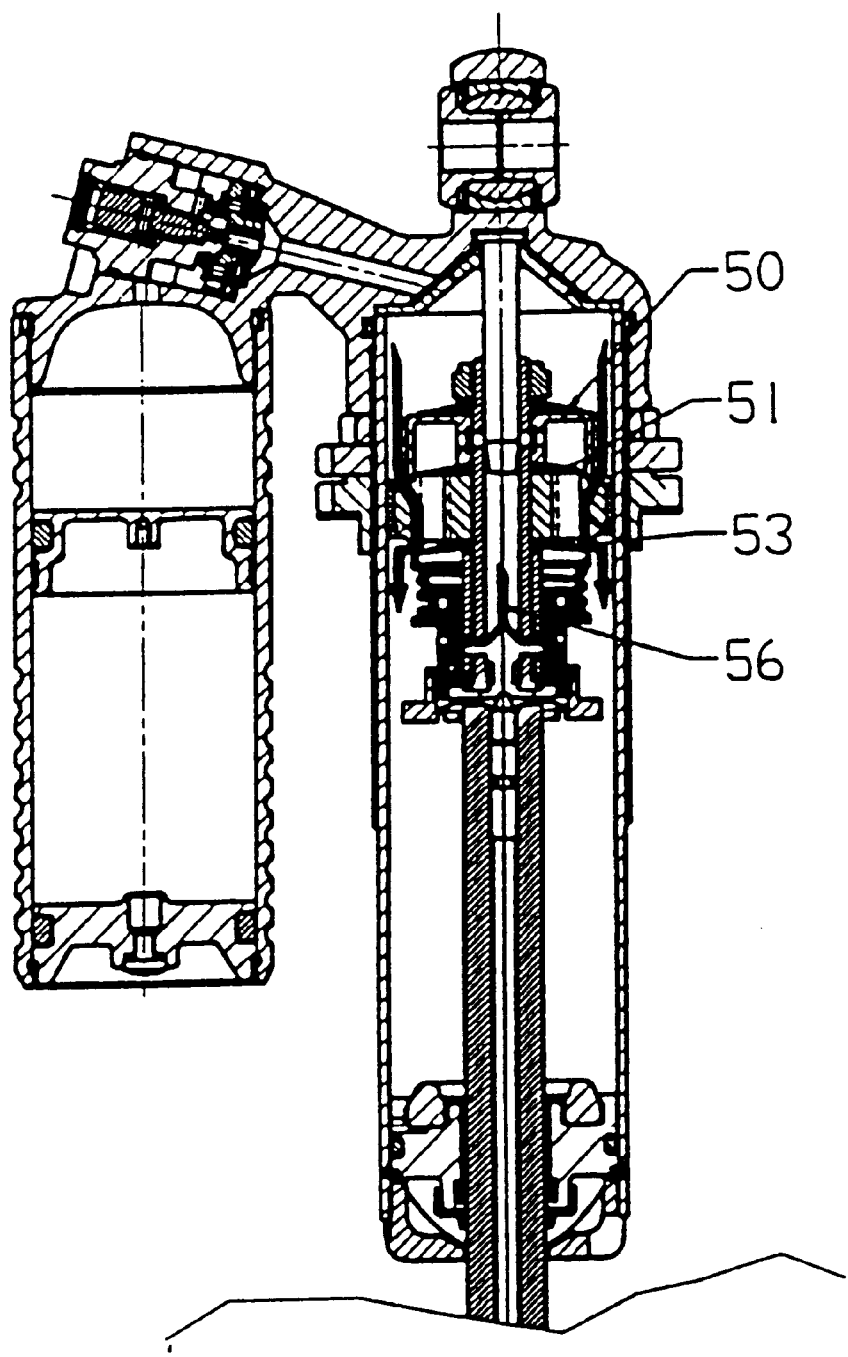
Figure 21:
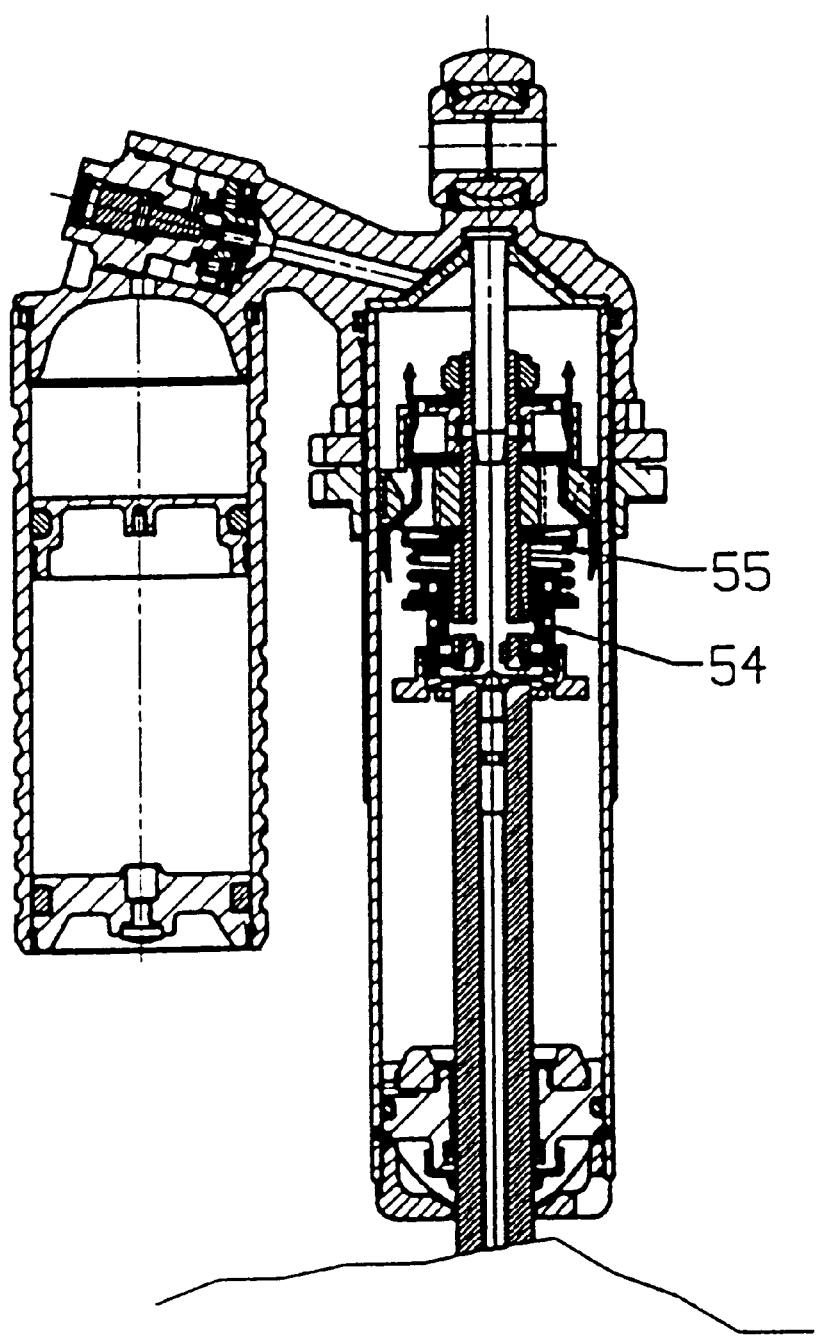
Figure 22:
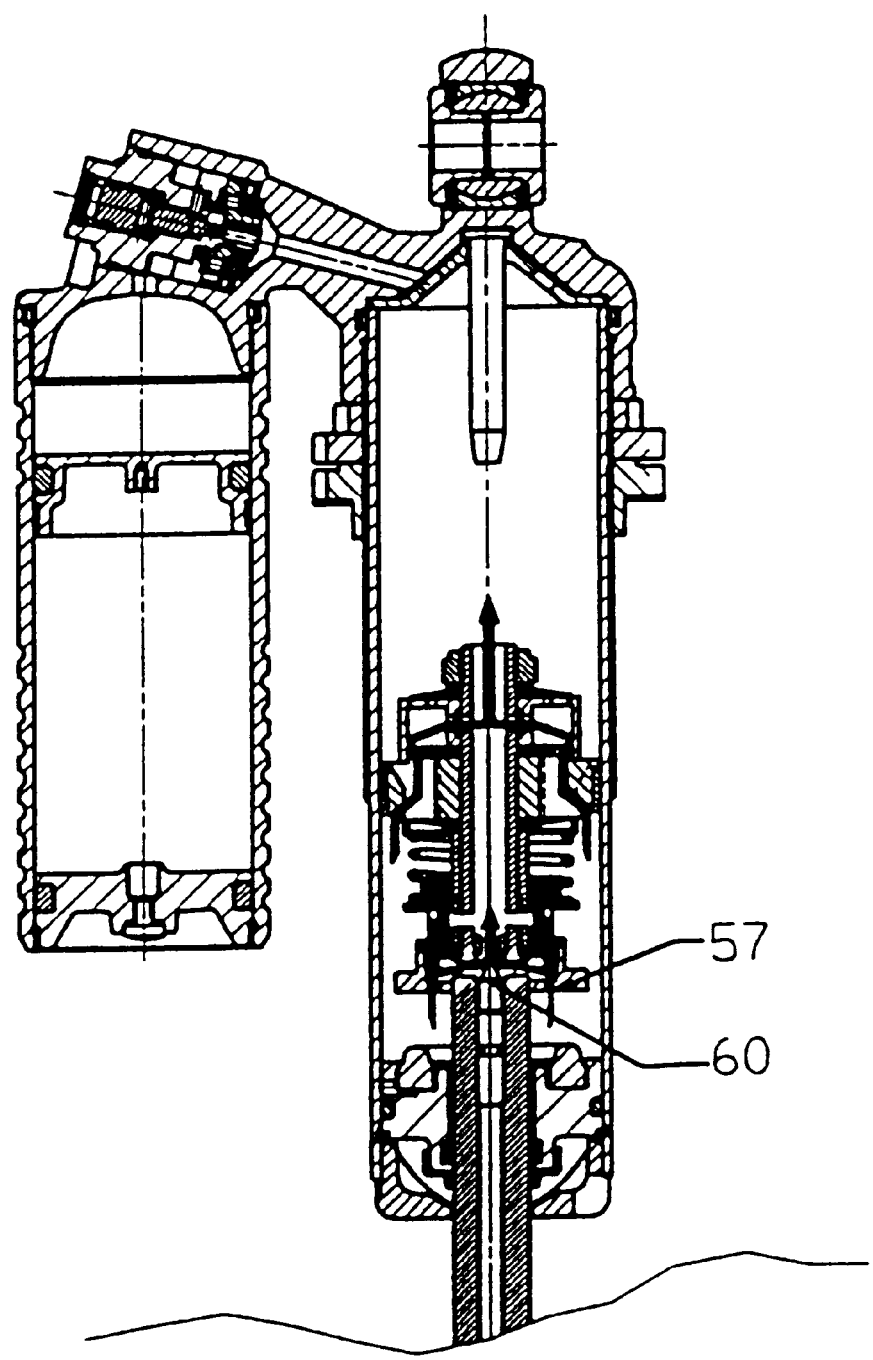

FIGS. 19–22 show a further illustrative embodiment. In this case, the return damping follows the above principle, i.e. near the inner limit position, return flow is forced to pass two shim stacks because the guide pin or the constriction element completely or partially blocks the passage. On the compression side, by contrast, there is only one shim stack, and this functions normally near the outer limit position. When the constriction element or the guide pin enters into engagement with the piston, the element will completely close off a limited oil volume which, as the piston presses further over the constriction element, acts on a displaceable slide which prestresses a spring which presses upon the shim stack. This increased prestressing of the shim stack gives an increased damping force towards the end of the in-stroke. FIGS. 19 and 20 show the case of the compression stroke, where FIG. 19 shows the case when the piston is in the outer position, and FIG. 20 shows the case when the piston has entered into cooperation with the guide pin or the constriction element. FIGS. 21 and 22 show corresponding function positions for the expansion stroke. In the case according to FIG. 19, only the lower shim stack 53 is operative. In this case, the piston has a projecting, hood-shaped part, and the flow of medium passes outside this upwardly projecting part on the outside of the part and via through-orifices in the actual piston head (see above) to the underside of the piston. When the piston reaches the position of cooperation with the constriction element or the guide pin according to FIG. 20, a slide 54 is acted upon and in turn prestresses the spring 55 which presses harder against the lower shim stack 53. The spring constant in the latter consequently increases, resulting in a higher damping from the shock absorber in its inner position. The activation of the slide 54 is effected by means of an enclosed oil volume 56, whose activation function longitudinally displaces the slide upwards in the case according to FIG. 20.

In the expansion position according to FIG. 21, the medium is conveyed from the underside of the piston, via the through-orifices in the piston and the inner space (see above), into the hood-shaped part. On entering the space, the central stack 55 is engaged, and on exiting the hood via outlet orifices, the upper stack 50 is engaged. When the piston has ended its cooperation with the guide pin or the constriction element, the adjustment of the oil volume 56 ceases and the slide 54 returns to a starting position which is defined by means of the spring 55 and a stop member 57. The working medium is conveyed via the through-orifices of the piston and into the space on the hood-shaped part, via transverse orifices (see above) and in via the central recess in the piston to the top side of the piston. Thus, only the center-most shim stack 51 is engaged. In addition, a flow is conveyed via through-orifices in the stop member 57 and into the central recess where a constriction function 60 is arranged for the oil volume flow in question.

Figure 23:
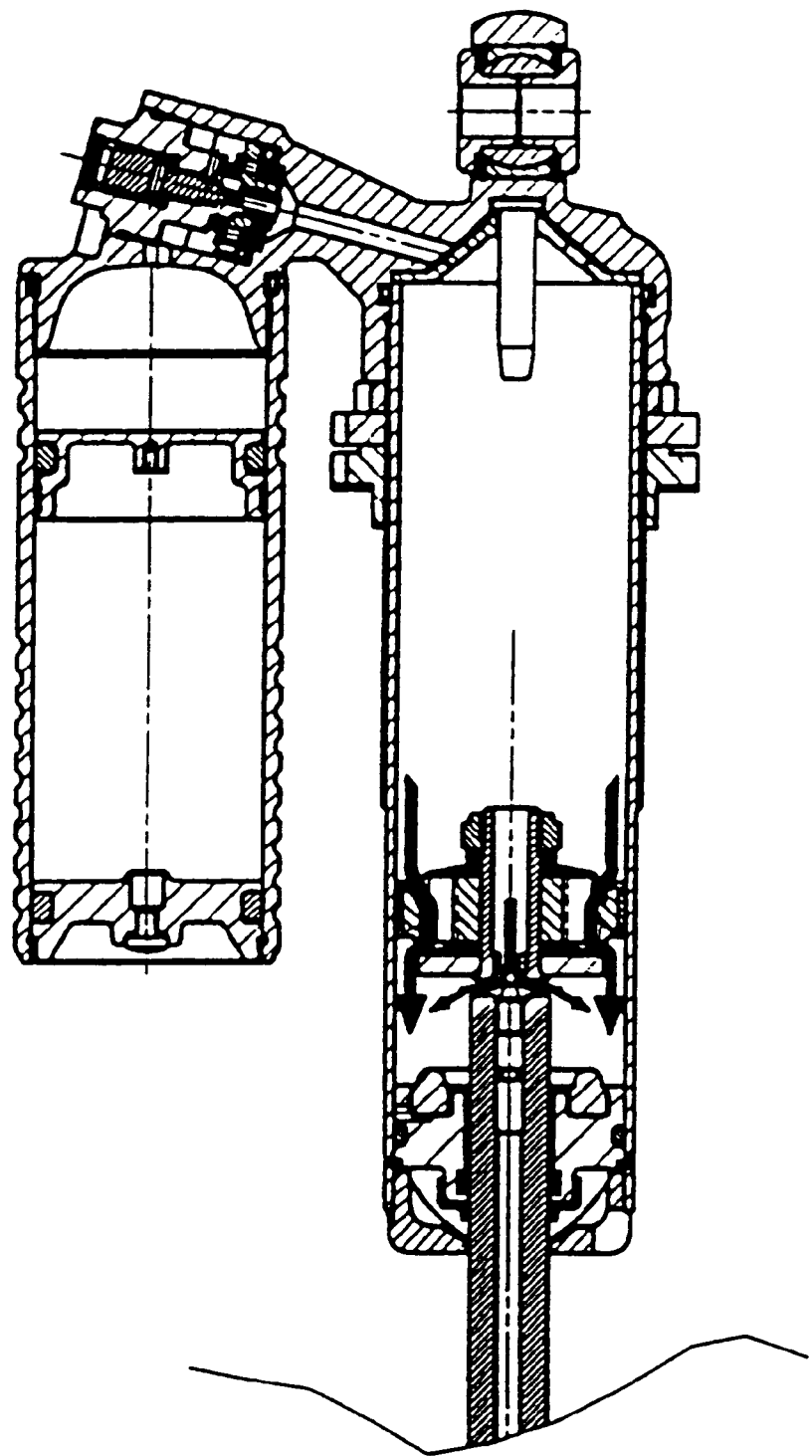
Figure 24:
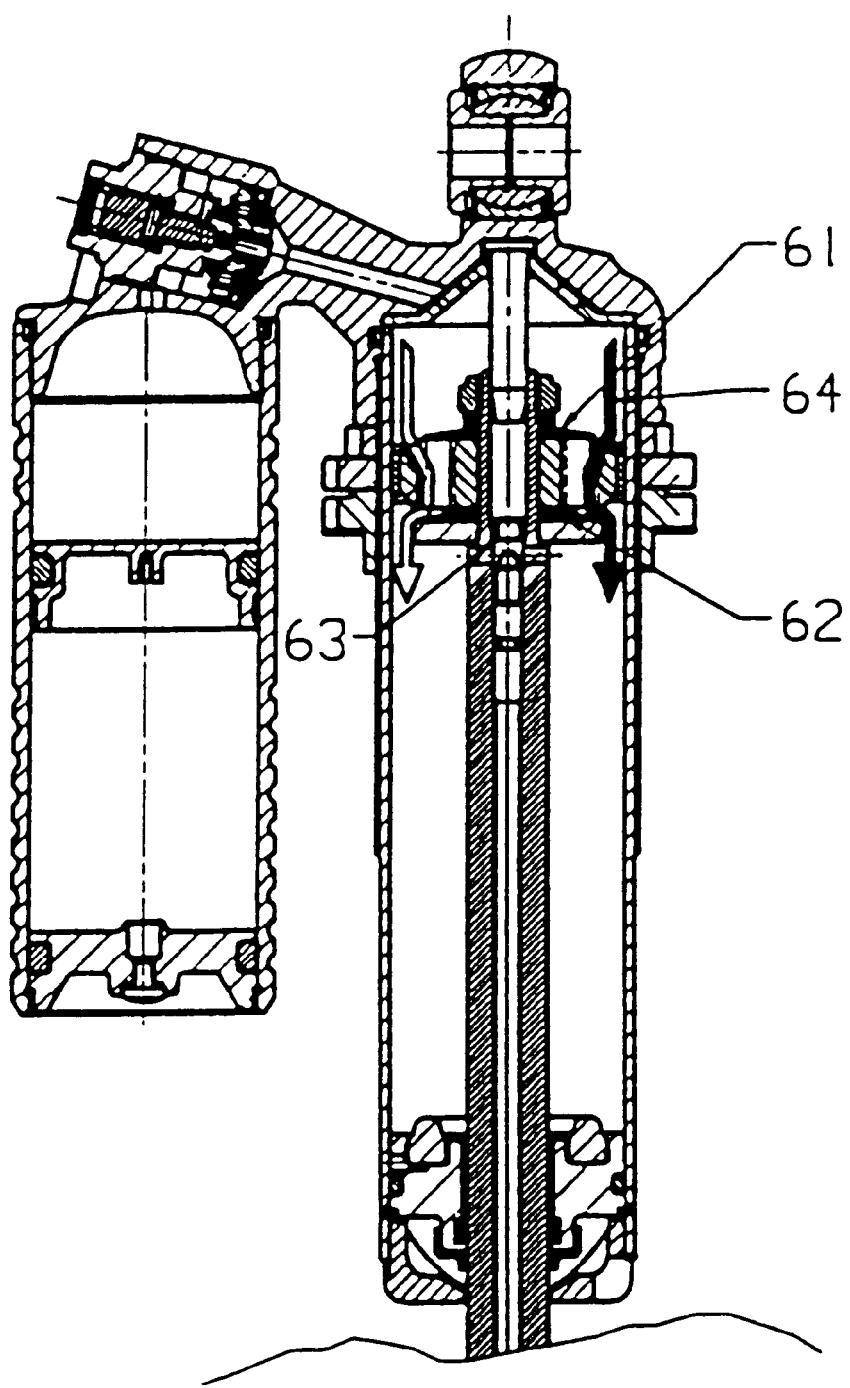
Figure 25:
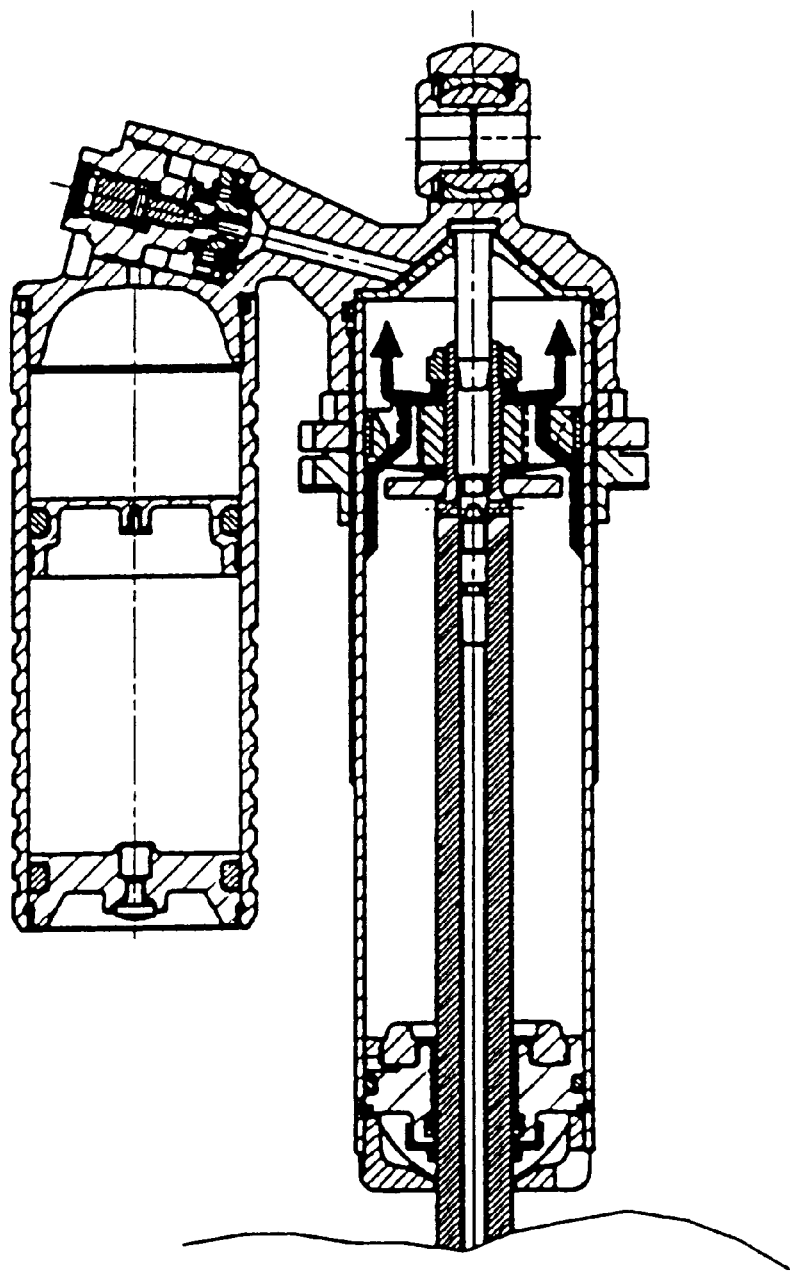

In the embodiment according to FIGS. 23–25, the oil flow or the working medium is conveyed in accordance with a conventional gas pressure shock absorber, for example in accordance with the öhlins shock absorber sold on the market, along two paths. In the first place, the main flow passes through the shim stack in the piston. The compression shim stack is used upon compression, and the return stack is used upon the return stroke. A smaller flow, here also called low edge flow, passes the piston without passing the shim stacks. This flow can also be regulated using a special needle nozzle. The flow or the working medium can thus be gradually constricted when the piston/piston rod approaches its inner limit position. In this way it is possible to achieve an increase in both the compression damping and the return damping. In this case, the piston has only two shim stacks 61 and 62, and the nozzle arrangement is indicated by 63. The main flow of medium is indicated by 64, and the lesser flow is indicated by 65.

Figure 26:
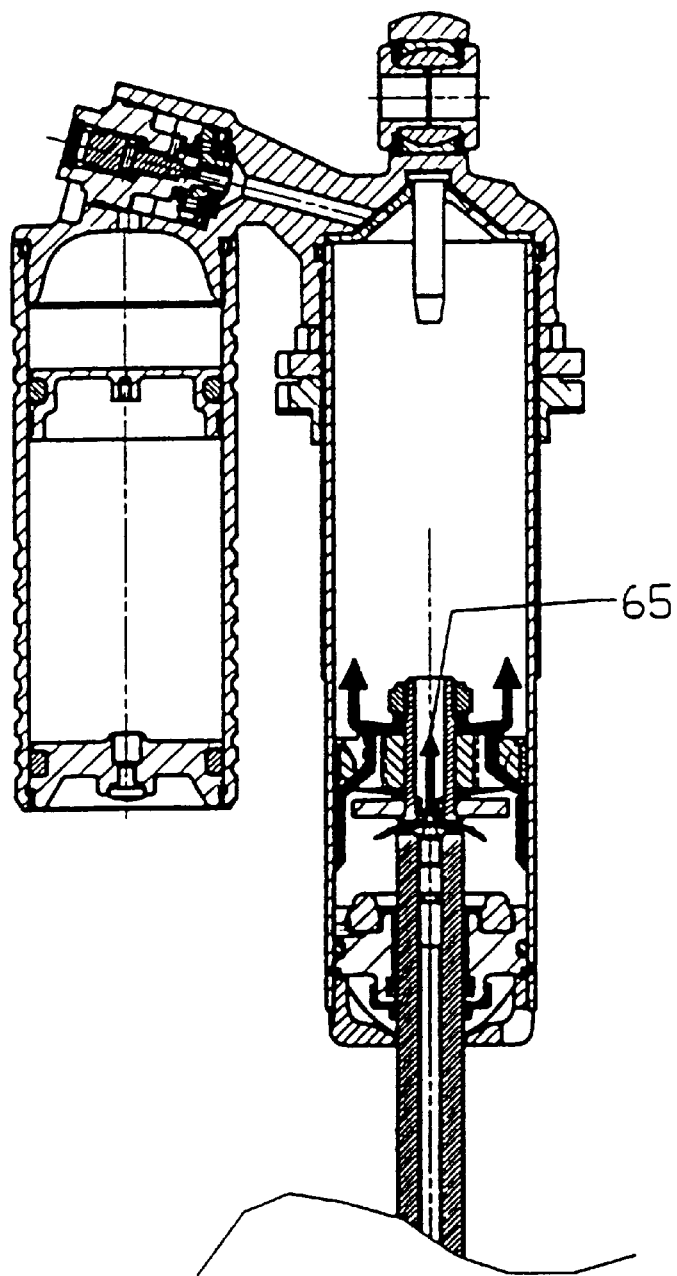
Figure 27:
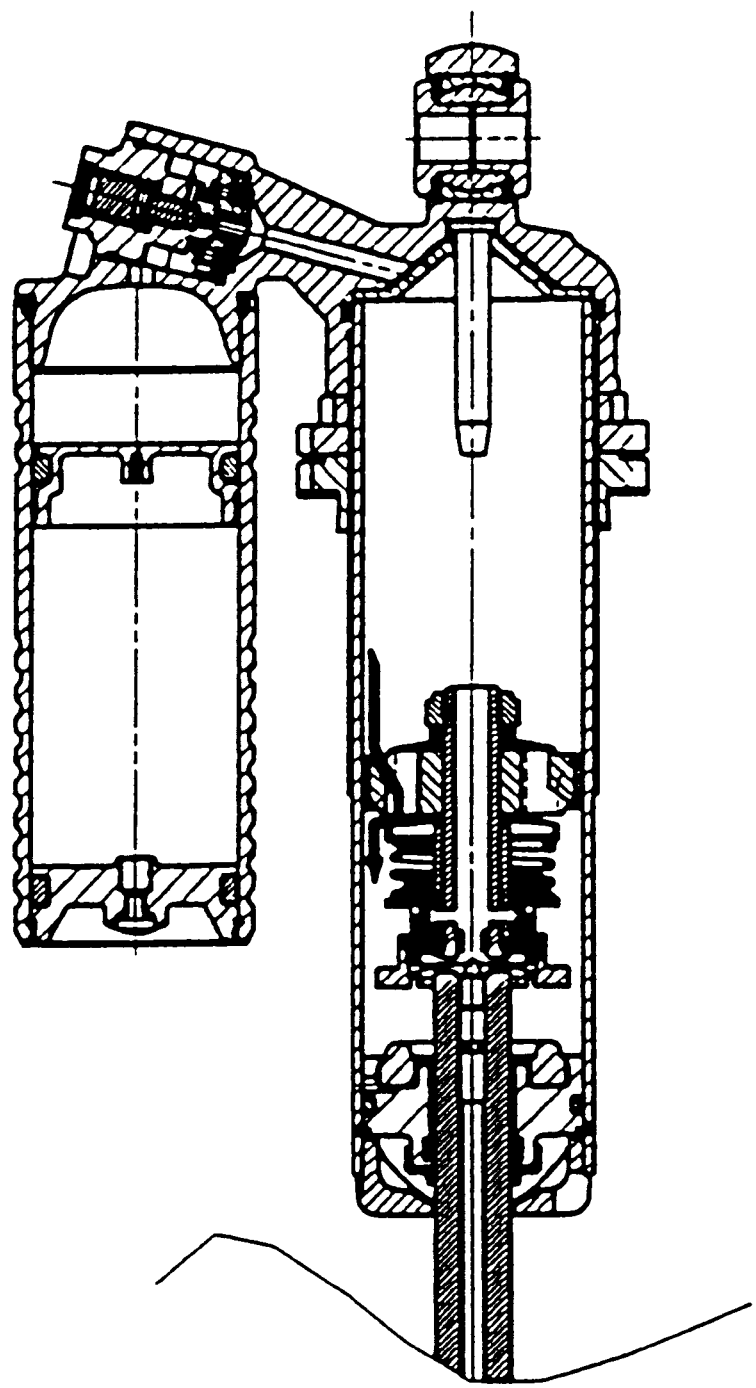

FIGS. 23 and 24 concern, in accordance with the above, the compression stroke, FIG. 23 showing the case with the piston in outer positions, and FIG. 24 showing the with the piston in an inner position. The expansion stroke is shown in a corresponding manner in FIGS. 25 and 26, with FIG. 25 showing the inner position and FIG. 26 showing the outer position. When the piston according to FIG. 23 is in non-cooperation, both the main flow of medium and the lesser parallel flow are present. The main flow of medium is conveyed via through-orifices in the piston and cooperates with the shim stack on the underside of the piston. The lesser flow is conveyed through the central recess of the piston (see above) and via the needle nozzle arrangement and out via transverse orifices to the underside of the piston. According to FIG. 24, the lesser flow is constricted by the constriction element, and only the main flow of medium 64 is effected. The omission of the lesser flow 65 results in an increased damping constant for the shock absorber in the position shown in FIG. 24.

FIG. 25 shows that the main flow is essentially in the opposite direction in relation to the case according to FIG. 24, the upper shim stack 61 being engaged instead. When, according to FIG. 26, the piston assumes its outer position, the parallel inner flow 25 can reemerge and its direction is essentially opposite to the flow direction according to FIG. 23.

FIGS. 27–30 show a case where only a return shim stack is included. This means that the return damping is speed-dependent only and does not have any position-dependent component. This case has great similarities to the embodiment according to 19–22. Only two shim stacks 66 and 67 are arranged on the piston (the center-most shim stack 51 according to FIG. 20 is thus omitted). The lower shim stack 67 can be prestressed in a corresponding way to the shim stack 53 in FIG. 20. In the compression position according to FIGS. 27 and 28, only the lower shim stack 67 is activated. In the position of the piston cooperating with the guide pin or the constriction element, the slide and the spring (see 54 and 55 in FIG. 21) have been activated by the enclosed oil volume (see 56 in FIG. 20). This correspondingly gives a higher spring constant for the shock absorber compared to the case according to FIG. 27. The flow of medium is conveyed via through-orifices in the piston head and via the shim stack 67.

Figure 28:
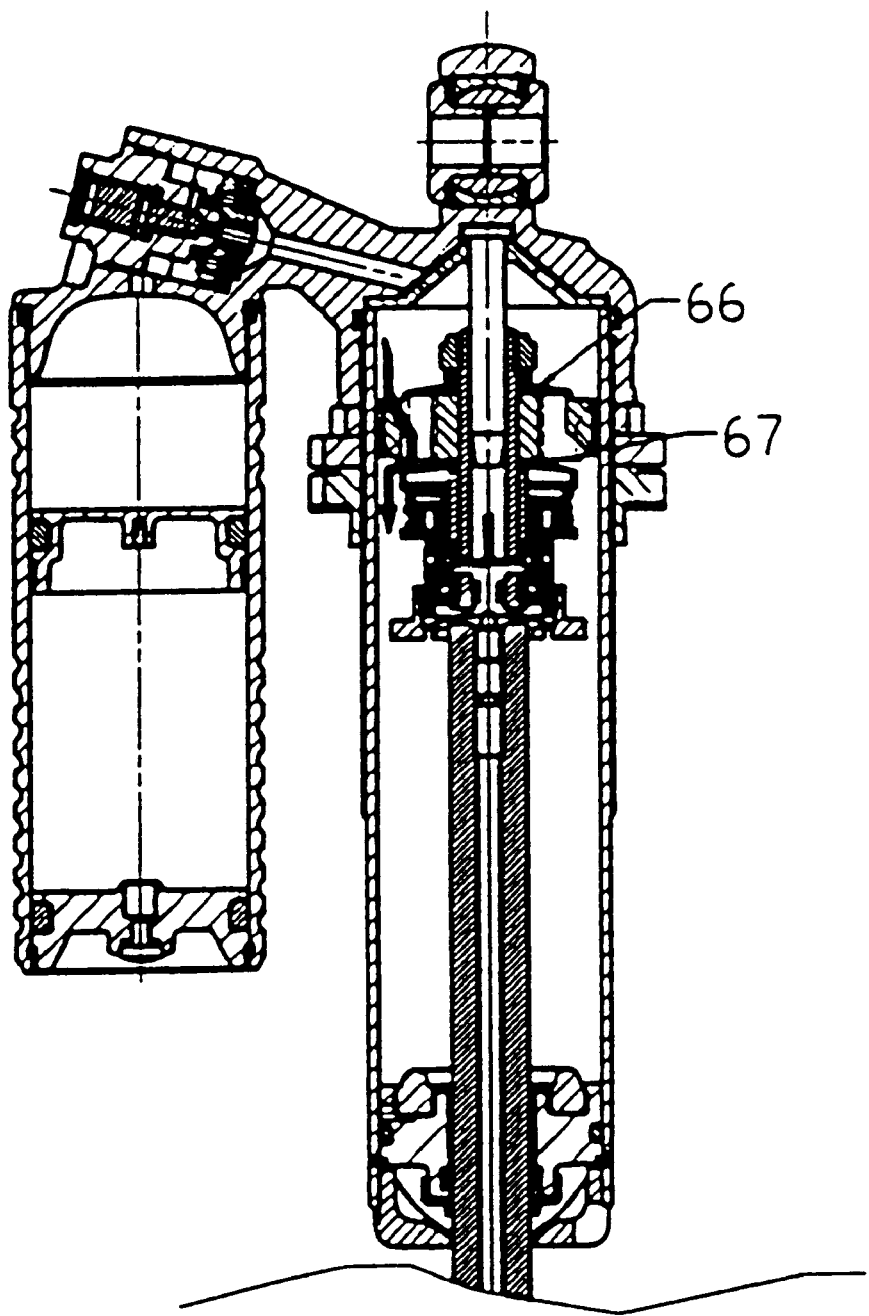
Figure 29:
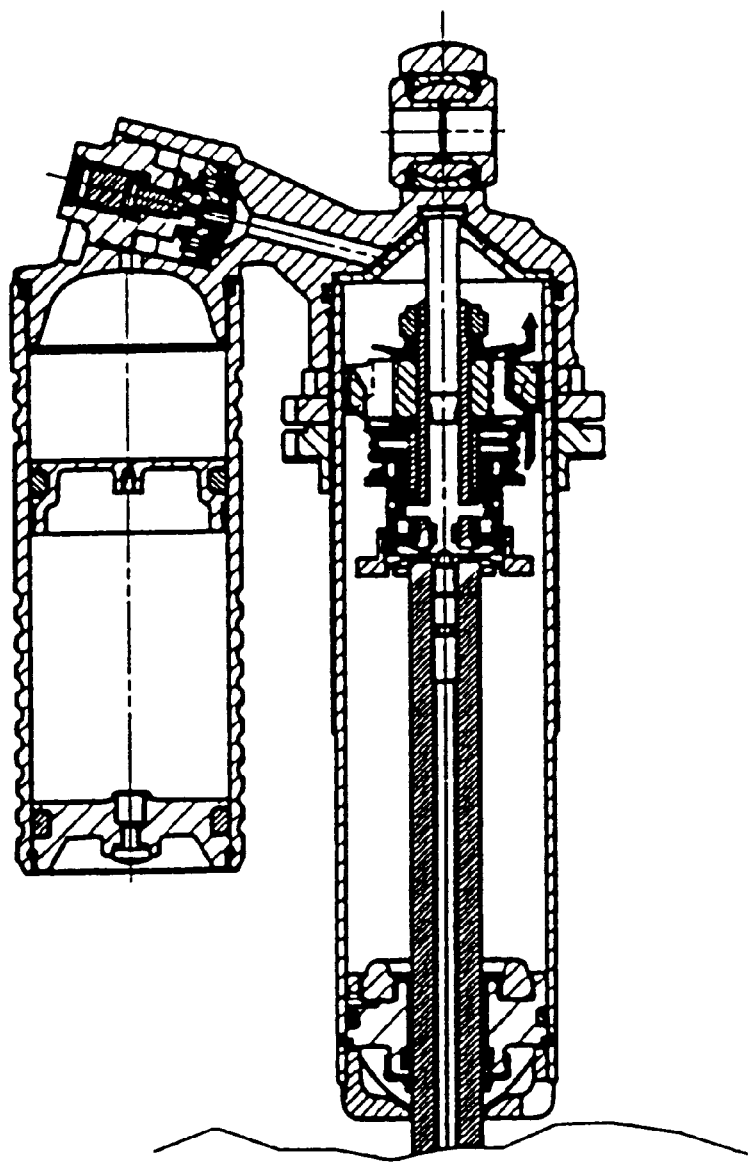
Figure 30:
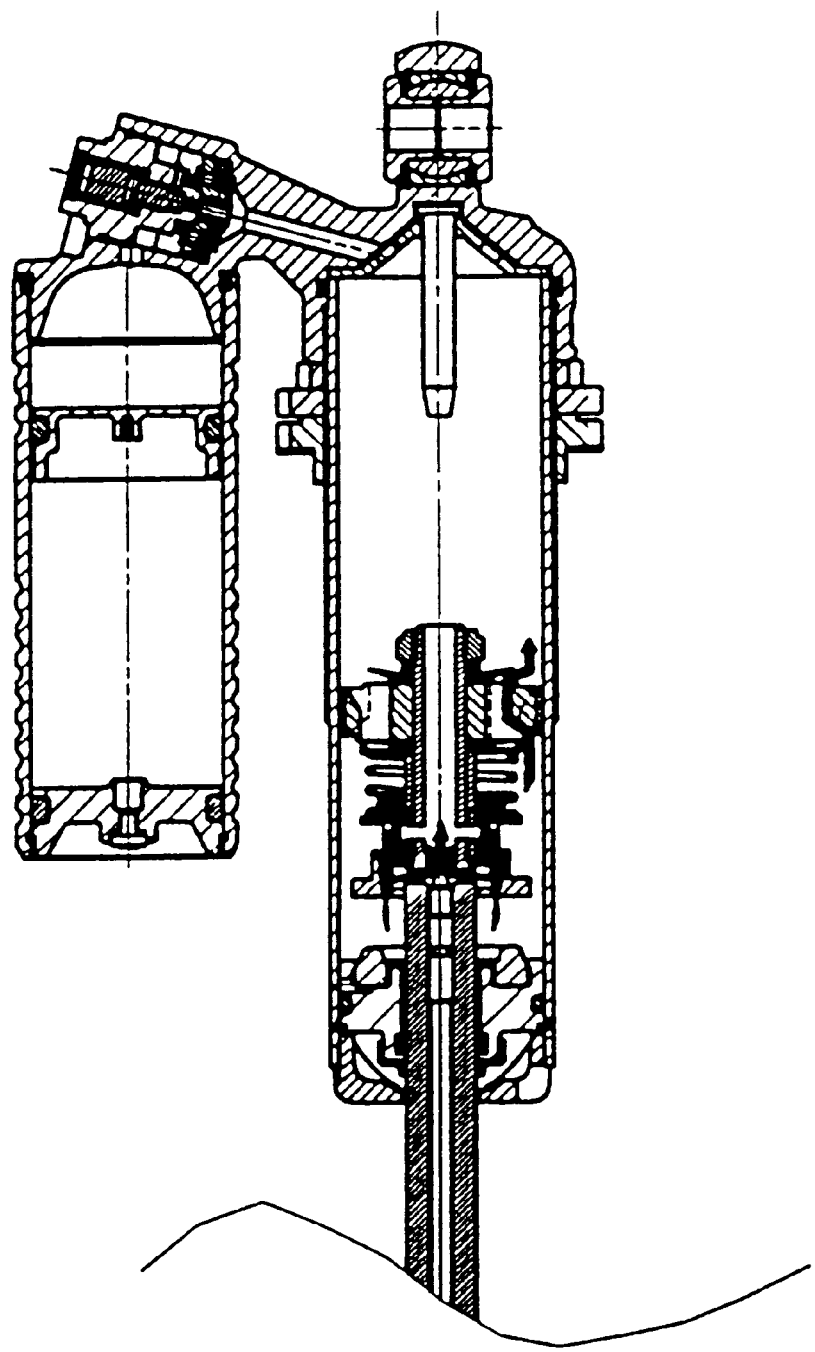

In expansion strokes, at the piston position capable of cooperation with the constriction element in accordance with FIG. 29, the medium is conveyed in a manner corresponding to the case according to FIG. 28, but in the reverse direction, so that the upper shim stack 66 is engaged. This shim stack is not exposed to any extra action but the shock absorber offers a lower damping resistance upon the expansion stroke than compared to the case according to FIG. 28. In the case according to FIG. 30, it is still the upper shim stack 66 which is activated, hence the speed-dependent damping force execution.

Figure 31:
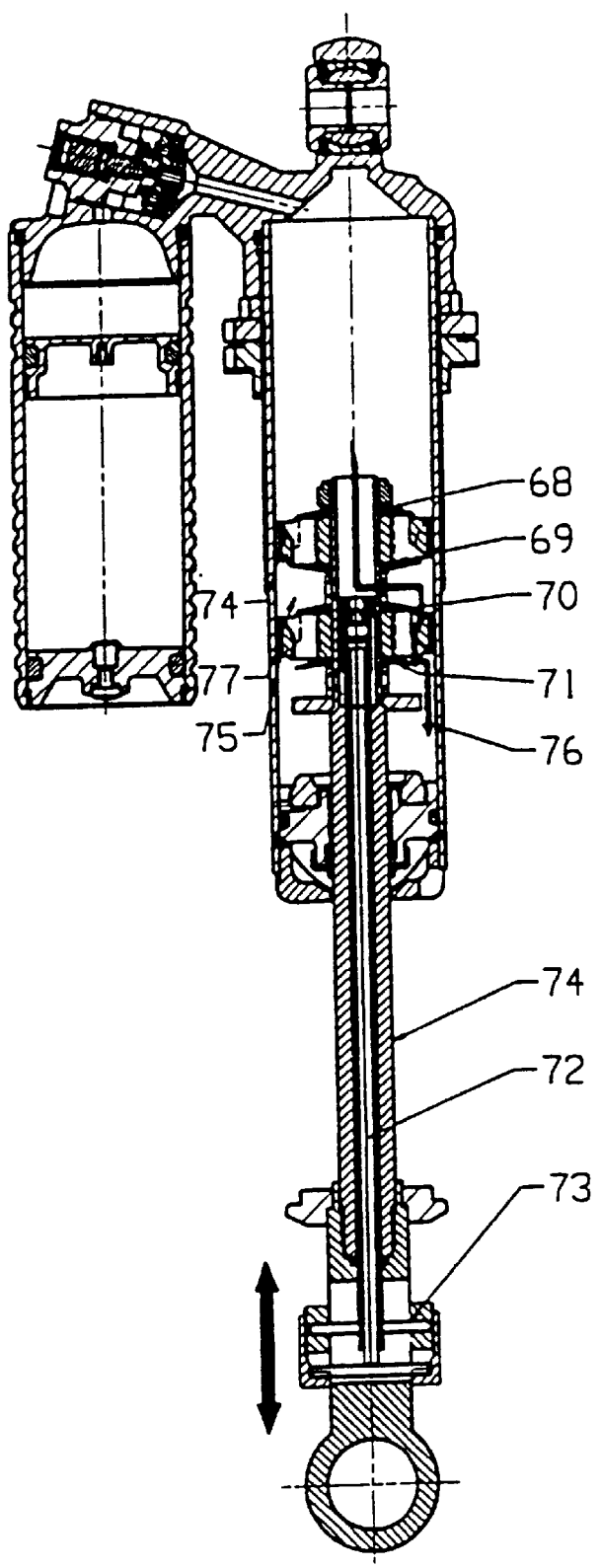
Figure 32:
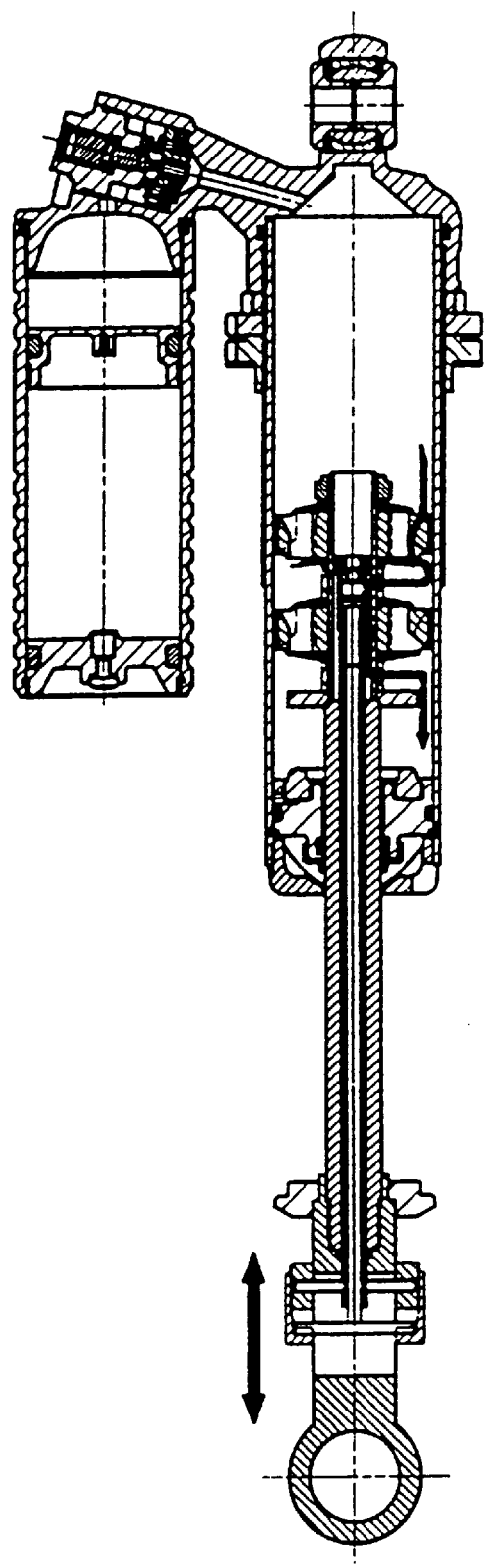
Figure 33:
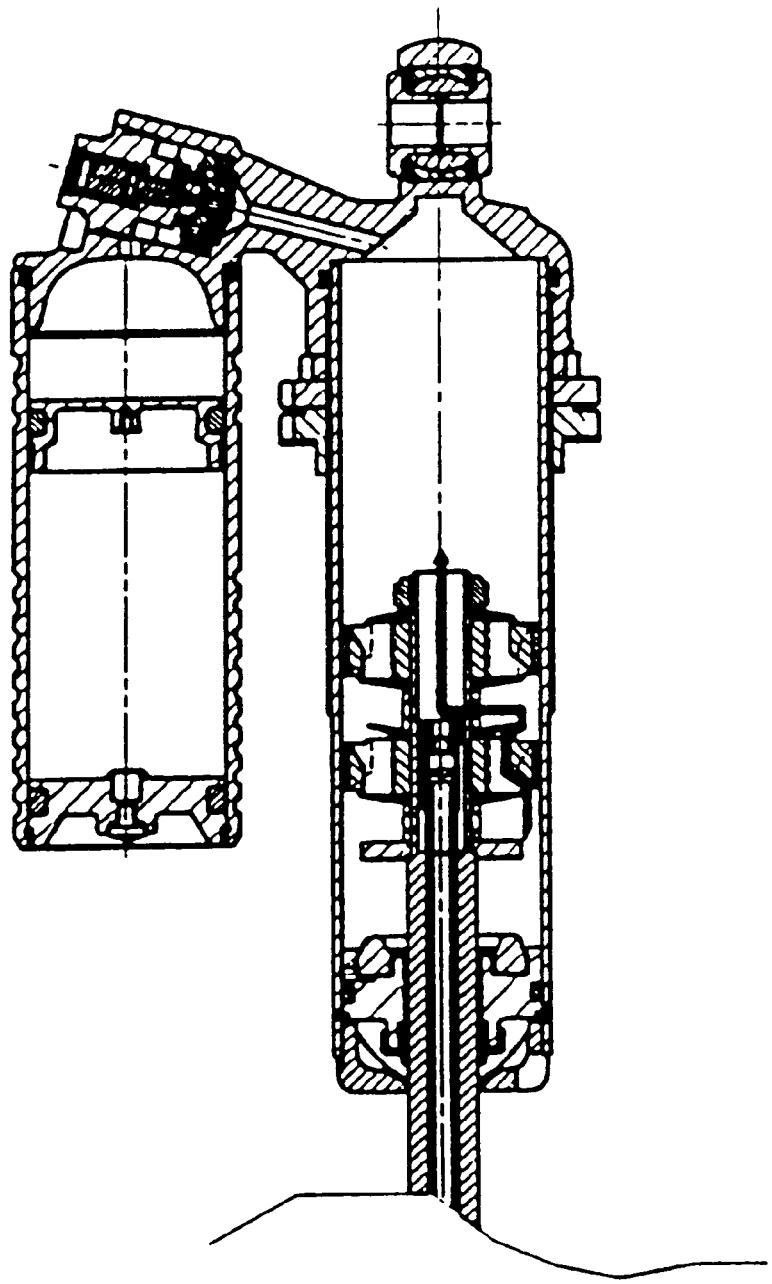
Figure 34:
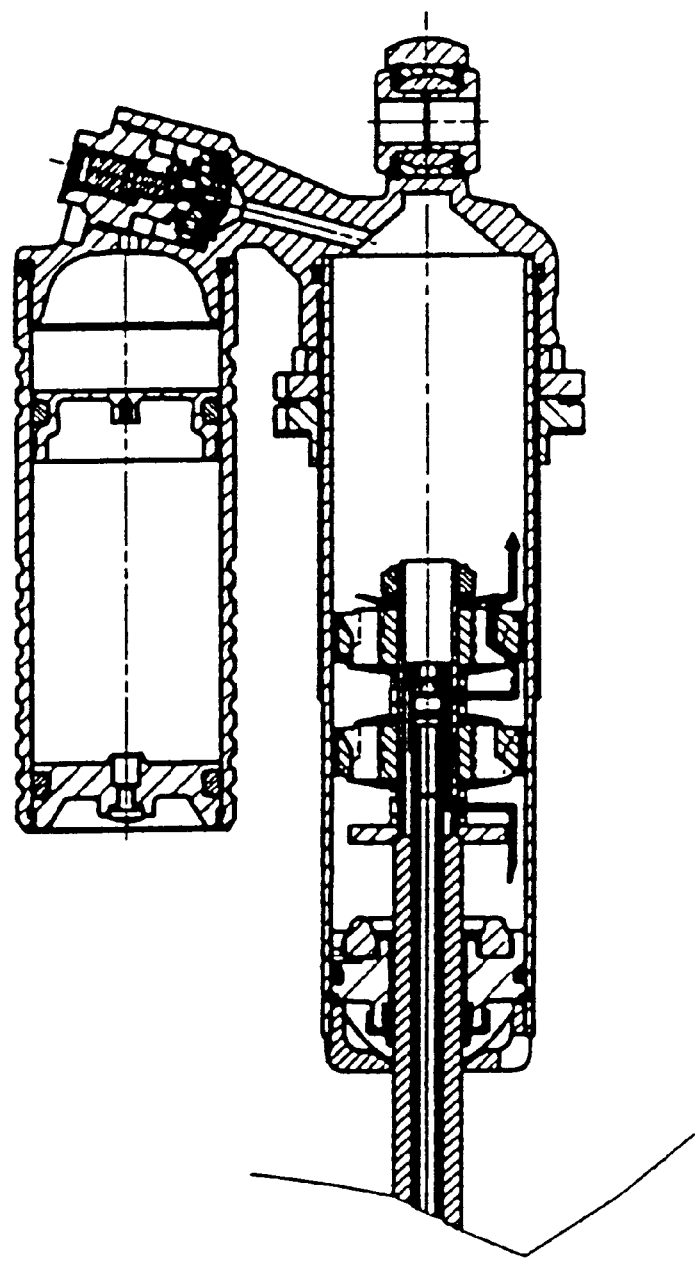

In the illustrative embodiment according to FIGS. 31–34, the shock absorber has two pistons, each with its pair of shim stacks. Depending on the position of a slide in the center of the piston rod, the working medium or the oil flow goes either through the shim stack of one piston or through the shim stack of the other piston. In this way it is possible to choose between two different damping force settings. The damping is not therefore position-dependent and instead can be adjusted by means of a control function. The case according to FIG. 31 shows a first operational case in a first part of the compression stroke. Four shim stacks 68, 69, 70 and 71 are included, as well as a slide 72 and control arrangement 73 for the longitudinal displacement of the slide relative to the piston rod 74. The shim stacks are arranged on two pistons 74 and 75, and the shim stacks 68 and 69 are arranged on the piston 74 and the shim stacks 70 and 71 on the piston 75. With the slide in the position shown in FIG. 31, the working medium is conveyed from the top side of the pistons via a central recess in the piston 74, via transverse orifices (see above) and into an intermediate space 77, from which the medium is conveyed via through-orifices (see above) in the second piston 75. In this case, only the shim stack 71 is engaged. When the adjustment member 73 in FIG. 32 assumes its second position in the case of the compression stroke, the working medium is instead conveyed via through-orifices in the upper piston 74 to the intermediate space 77 and in via transverse orifices (see above) to an axial space in the lower piston 75, which axial space is parallel with part of the slide 72. From the last-mentioned axial space, the working medium is conveyed via transverse orifices out under the lower piston to the underside of the piston. The lower shim stack 69 on the upper piston is here activated instead of the lower shim stack 71 on the lower piston. By assigning the shim stacks 69 and 71 different spring constants, different damping constants can be established from the shock absorber by activation of the adjustment members 73.

Corresponding adjustment or activation can take place in the expansion stroke when instead the upper shim stacks 68 and 70, respectively, of the pistons 74 and 75 are activated in a corresponding manner. Medium is conveyed through in the opposite direction, i.e. the conveying of medium in accordance with FIG. 33 takes place in the opposite direction to the conveying of medium in FIG. 31. The same applies to the cases according to FIGS. 34 and 32, respectively.

The invention is not limited to the embodiment shown in the above example, and instead can undergo modifications within the scope of the patent claims which follow.

What is claimed is:

1. A shock absorber comprising:

a cylinder containing a piston rod and a piston, the piston being moveable between inner and outer positions via the piston rod by which movement working medium flows;

first shim stacks provided on the piston; and a unit separate from the cylinder containing second shim stacks, the working medium flowing via the second shim stacks in at least one of the strokes of the shock absorber, wherein in the outer positions of the piston the working medium flows via one of the first shim stacks on the piston and in the inner positions of the piston the working medium flows via additional ones of the first or second shim stacks whereby an increased damping compared to the outer positions of the piston is achieved, wherein said shock absorber further comprises a constriction element defining an axially extending recess, the constriction element being arranged in the cylinder to communicate with the piston in inner positions of the piston, and wherein the first shim stacks include three shim stacks, a middle shim stack arranged inside the piston, and inner and outer shim stacks arranged at upper and lower sides of the piston respectively, an outer space being defined inside the piston between the middle and inner shim stacks, whereby during expansion strokes when the piston is in the inner positions, the inner and middle shim stacks are engaged and when the piston is in the outer position only the middle shim stack is engaged, and during compression strokes when the piston is in the outer positions the outer shim stack is engaged and when the piston is in the inner positions the second shim stacks in the unit are additionally engaged and the working medium is conveyed via the recess in the constriction element to the outer space.

2. A shock absorber according to claim 1 wherein the damping becomes greater the farther the piston moves into the inner position, the damping being greatest at an end position.

* * * * *